United States Patent
Shinjo

(10) Patent No.: US 8,073,874 B2
(45) Date of Patent: Dec. 6, 2011

(54) BIT STRING SEARCHING APPARATUS, SEARCHING METHOD, AND PROGRAM

(75) Inventor: Toshio Shinjo, Chiba (JP)

(73) Assignee: S. Grants Co., Ltd., Chiba (JP)

( * ) Notice: Subject to any disclaimer, the term of this patent is extended or adjusted under 35 U.S.C. 154(b) by 343 days.

(21) Appl. No.: 12/308,560

(22) PCT Filed: Jun. 15, 2007

(86) PCT No.: PCT/JP2007/000639
§ 371 (c)(1),
(2), (4) Date: Dec. 18, 2008

(87) PCT Pub. No.: WO2008/004335
PCT Pub. Date: Jan. 10, 2008

(65) Prior Publication Data
US 2009/0240655 A1    Sep. 24, 2009

(30) Foreign Application Priority Data

Jul. 7, 2006    (JP) ................................. 2006-187827

(51) Int. Cl.
*G06F 17/30* (2006.01)

(52) U.S. Cl. ........................................ 707/797; 707/706
(58) Field of Classification Search .................. None
See application file for complete search history.

(56) References Cited

U.S. PATENT DOCUMENTS

| 6,012,061 A | 1/2000 | Sharma |
| 6,029,170 A * | 2/2000 | Garger et al. ......................... 1/1 |
| 6,675,163 B1 * | 1/2004 | Bass et al. ............................. 1/1 |

FOREIGN PATENT DOCUMENTS

| JP | 07-210569 A | 8/1995 |
| JP | 2001-357070 A | 12/2001 |
| JP | 2003-224581 A | 8/2003 |

OTHER PUBLICATIONS

"*Patorishia Tsuri (Patricia Tree)*", vol. 11, No. 2, pp. 337-339, Journal of Japanese Society for Artificial Intelligence (Mar. 1, 1996).

(Continued)

*Primary Examiner* — Mohammad Ali
*Assistant Examiner* — Syed H Hasan
(74) *Attorney, Agent, or Firm* — Rader, Fishman & Grauer PLLC

(57) ABSTRACT

A bit string searching apparatus has a coupled node tree, having a root node and a node pair, the node pair being a branch node and leaf node, or a pair of branch nodes, or a pair of leaf nodes in adjacent storage areas, the branch node including a search key discrimination bit position and information indicating a position of one node of a node pair of a link target, and the leaf node including an index key that is a bit string that is the target of a search, wherein a search for an index key from the root node to a branch node using a search key is executed by repeatedly and successively linking to one node of a node pair of a link target, according to a bit value of a search key at the discrimination bit position in the branch node, until reaching the leaf node.

19 Claims, 19 Drawing Sheets

OTHER PUBLICATIONS

Akira Nakamori, "*Memori no Gainen wo Rikai suru (Understanding Memory Concept)*," vol. 32, No. 2, pp. 44-53, Interface (Feb. 2, 2006) (In particular, the portion of the article entitled "Hairetsu o Shitei suruto Memory Ryoiki o Kakuho suru," pp. 49-50 of the same.).

Alfred V. Aho et al., "*Arugorizumu no Sekkei to Kaiseki I (The Design and Analysis of Computer Algorithms I), First Edition*", pp. 132-136, Saiensu-Sha Co. Ltd., Japan (Oct. 30, 1977).

International Search Report (Aug. 14, 2007).

D. Goto, "*Sawatte Manabu Data Kozo, Tsukatte Mini Tsuku Algorithm Kochira Java API Kenkyusho!*" Java Press, vol. 34, pp. 202-210, Japan (Feb. 15, 2004).

S. Yazaki, "*Zu De Wakaru! Programming No. 10 Dai Kisochishiki Data Kozo*," Nikkei Software, vol. 6, No. 2, pp. 44-45, Japan (Jan. 24, 2003).

R. Sedgewich, "*Algorithms*", vol. 1, 1st edition, Kinda Kagaku Sha Co., Ltd. pp. 49-54, Japan (Oct. 10, 1990).

Office Action of Japanese Patent Application No. 2006-187827 mailed on Dec. 2, 2008 (Japan).

Jung et al., "A Dynamic Construction Algorithm for the Compact Patricia Trie using the Hierarchical Structure", Information Processing & Management, vol. 38, No. 2, Mar. 1, 2002, pp. 221-236.

Communication from European Patent Office for Application No. 07766946.3-1225 dated Feb. 19, 2010.

Xin Li et al. "Stateful Inspection Firewall Session Table Processing," International Journal of Information Technology, vol. 11, No. 2, pp. 21-30 (2005).

Nilsson, et al., "IP-Address Lookup Using LC-Tries", IEEE Journal on Selected Areas in Communications, vol., 17, No. 6, Jun. 1999, pp. 1083-1092.

\* cited by examiner

BIT STRING SEARCHING APPARATUS, SEARCHING METHOD, AND PROGRAM

CROSS-REFERENCE TO RELATED APPLICATIONS

The present application claims the benefit of patent application number 2006-187827, filed in Japan on Jul. 7, 2006, the subject matter of which is hereby incorporated herein by reference.

BACKGROUND OF THE INVENTION

1. Field of the Invention

The present invention relates to a searching apparatus that searches for a desired bit string from a set of bit strings, and more particularly to a field of art in which refinement is done to the data structure in which bit strings are stored to effect an improvement in searching speed and the like.

2. Description of Related Art

In recent years, with advancements in information-based societies, large-scale databases have come to be used in various places. To search such large-scale databases, it is usual to search for a desired record, retrieving the desired record by using as indexes items within records associated with addresses at which each record is stored. Character strings in full-text searches can also be treated as index keys.

Because the index keys can be expressed as bit strings, the searching of a database is equivalent to searching for bit strings in the database. In order to perform the above-noted searching for bit strings at high speed, conventional art makes various refinements on the data structure in which bit strings are stored. One of these is a tree structure known as a Patricia tree.

FIG. 1 shows an example of a Patricia tree used for searching processing in the above-noted conventional art. A node of a Patricia tree is formed to include an index key, a test bit position for a search key, and right and left link pointers. Although it is not explicitly shown, a node of course includes information for the purpose of accessing a record corresponding to the index key.

In the example shown in FIG. 1, the node 1750$a$ that holds the index key "100010" is a root node, the test bit position 1730$a$ of which is 0. The node 1750$b$ is connected to the left link 1740$a$ of the node 1750$a$, and the node 1750$f$ is connected to the right link 1741$a$ of the node 1750$a$.

The index key held by the node 1750$b$ is "010011," and the test bit position 1730$b$ is 1. The node 1750$c$ is connected to the left link 1740$b$ of the node 1750$b$, and the node 1750$d$ is connected to the right link 1741$b$ of the node 1750$b$. The index key held by the node 1750$c$ is "000111," and the test bit position is 3. The index key held by the node 1750$d$ is "011010," and the test bit position is 2.

The parts connected to the node 1750$c$ by a solid lines show the right and left link pointers of the node 1750$c$, and the left pointer 1740$c$ that is not connected by the dotted line indicates that that field is blank. The dotted line connection destination of the right pointer 1741$c$ that is connected by a dotted line expresses the address indicated by the pointer, and in this case this indicates that the right pointer points to the node 1750$c$.

The right pointer 1741$d$ of the node 1750$d$ points to the node 1750$d$ itself, and the node 1750$e$ is connected to the left link 1740$d$. The index key held by 1750$e$ is "010010," and the test bit position is 5. The left pointer 1740$e$ of the node 1750$e$ points to the node 1750$b$, and the right pointer 1741$e$ of the node 1750$e$ points to the node 1750$e$.

The index key held by the node 1750$f$ is "101011," and the test bit position 1730$f$ is 2. The node 1750$g$ is connected to the left link 1740$f$ of the node 1750$f$ and the node 1750$h$ is connected to the right link 1741$f$ of the node 1750$f$.

The index key held by the node 1750$g$ is "100011," and the test bit position 1730$g$ is 5. The left pointer 1740$g$ of the node 1750$g$ points to the node 1750$a$, and the right pointer 1741$g$ of the node 1750$g$ points to the node 1750$g$.

The index key held by the node 1750$h$ is "101100," and the test bit position 1730$h$ is 3. The left pointer 1740$h$ of the node 1750$h$ points to the node 1750$f$, and the right pointer 1741$h$ of the node 1750$h$ points to the node 1750$h$.

In the example of FIG. 1, the configuration is such that, as the tree is traversed downward from the root node 1750$a$ the test bit position of successive nodes increases.

When a search is performed with some search key, the search keys' bit values corresponding to test bit positions held in nodes are successively tested from the root node, and a judgment is made as to whether the bit value at a test bit position is 1 or 0, the right link being followed if the bit value is 1, and the left link being followed if the bit value is 0. Unless the test bit position of a link target node is larger than the bit position of the link origin node, that is, if the link target is not below but rather returns upward (the returning links shown by the dotted lines in FIG. 1 being called back links), a comparison is performed between the index key of the link target and the search key. It is assured that if the result of the comparison is that the values are equal the search succeeds, but if the result is non-equal, the search fails.

As described above, although search processing using a Patricia tree has the advantages of being able to perform a search by testing only the required bits, and of it only being necessary to perform an overall key comparison one time, there are the disadvantages of an increase in storage capacity caused by the inevitable two links from each node, the added complexity of the decision processing because of the existence of back links, delay in the search processing by comparison with an index key for the first time by returning by a back link, and the difficulty of data maintenance such as adding and deleting a node.

Art such as disclosed in Japanese Laid-Open Patent Application Publication 2001-357070 exists as an attempt to solve these problems of the Patricia tree. In the Patricia tree described in Japanese Laid-Open Patent Application Publication 2001-357070, in addition to reducing the storage capacity for pointers by storing in the downstream left and right nodes in contiguous regions, the back link decision processing is reduced by providing a bit at each node that indicates whether the next link is or is not a back link.

Even in the art disclosed in Japanese Laid-Open Patent Application Publication 2001-357070, however, because one node always occupies an index key region and a pointer region, and because there is one pointer by storing down string left and right nodes in contiguous regions, there is not that great an effect of reducing the storage capacity, for example, it being necessary to assign the same capacity to the left pointer 1740$c$ and the right pointer 1741$h$, which are lowermost parts in FIG. 1. In addition, there is no improvement of the problem of delay in search processing caused by back links, and the difficulty of adding and deleting a node.

SUMMARY OF THE INVENTION

The problem that the present invention attempts to solve is to provide a bit string searching apparatus, a searching method, and a program having a bit string data structure for searching for a target, which requires a smaller amount of storage capacity, performs searching at high speed, and features easy data maintenance.

According to the present invention, a tree named as a coupled node tree and having a data structure as described below is provided, and a bit string search apparatus of the present invention uses this coupled node tree to perform searching for an index key.

The coupled node tree of the present invention has a branch node having link target data and a leaf node having an index key that is the target of searching. The tree structure is formed by a root node and a node pair stored in adjacent areas that is formed by a branch node and a leaf node, branch nodes, or leaf nodes.

A branch node includes a discrimination bit position in the search key and information indicating a position of one node of a node pair of a link target. A leaf node includes an index key formed by a bit string that is the target to be searched for. The root node is a branch node, with the exception of a tree having only one node.

In that the search key uses the bit value of the search key position, the discrimination bit position of the search key is similar to the test bit position of a Patricia key. However, the present invention is distinguished from the case of a Patricia tree, in which the bit value of the test bit position is judged to determine the link target, in that with the coupled node tree of the present invention the bit value of the discrimination bit position is used in a calculation to determine the link target.

The execution of a search using a search key is performed by repeatedly and successively linking to one node of a node pair of a link target, in accordance with the bit value of the search key at the discrimination bit position included in the branch node, until a leaf node is reached.

When a leaf node is reached, the index key held in the leaf node is compared with the search key and, if there is coincidence therebetween the search succeeds, but if there is no coincidence therebetween there was no coincidence with the search key in the index key of the item to be searched for.

In the case of adding an index key anew to the coupled node tree of the present invention, a search is first performed with that index key as the search key, and the index key of a leaf node that is found is acquired. The information for accessing branch nodes traversed up until the leaf node are successively stored on a stack.

A value comparison and a bit string comparison are performed between the index key to be added and the index key acquired by searching, and the insertion position for the node pair to be added is determined by the relative positional relationship between the most significant bit position having a bit value that is different in the bit string comparison and the discrimination bit positions of the branch nodes whose accessing information is stored in the stack, and which node of the node pair the leaf node including the index key to be added is determined by the value relationship.

When an index key is to be deleted from a coupled node tree in the present invention, a search is performed using the key to be deleted, and a node pair is deleted by the contents of a node that forms one and the same node pair as holds the index key that is to be deleted being stored in the branch node of the link origin of the node pair.

A coupled node tree according to the present invention has a tree structure made of node pairs, enabling a more compact tree for a set of index keys. Because nodes are separated into branch nodes that include a pointer and leaf nodes that include an index key, whereas nodes requiring pointer information are made to hold pointer information but do not require an area for an index key, and nodes requiring an index key do not required an area for a pointer, there is no wasted storage area. Additionally, there is no back-link processing as with a Patricia tree.

When a coupled node tree is stored in an array, it is possible to make the pointers array element numbers, thereby achieving a further reduction in the required storage capacity.

According to the present invention, it is possible to reduce the storage capacity for storing a tree structure used in searching as described above, this also enabling a reduction in the search processing load. Additionally, because branch nodes are disposed so as to hold discrimination bit positions that are prescribed by the makeup of bit strings of indexes included in the coupled node tree, processing is only required at required bit positions, and the branch processing load is small. Also, because the bit value at the discrimination bit position is not used in the decision processing but used in calculation processing, this also lightens the CPU processing load.

Also, the insertion processing and deletion processing for the coupled node tree are simple, and the maintenance load is light.

The present invention as described above provides a bit string searching apparatus that enables high-speed execution of bit string searching and features easy data maintenance.

BRIEF DESCRIPTION OF THE DRAWINGS

The foregoing and further objects, features, and advantages of the invention will become apparent from the following description of example embodiments with reference to the accompanying drawings, wherein like numerals are used to represent like elements, and wherein.

DESCRIPTION OF THE PREFERRED EMBODIMENTS

Preferred embodiments of the present invention are described below for the example of storing a coupled node tree in an array. Although it is possible to use address information in a storage device as the data indicating the position of a link target held by a branch node, by using an array formed by array elements that can store the larger occupied storage capacity area between a branch node and a leaf node, it is possible to express the node position as an array element number, enabling a reduction of the amount of position information.

Figure 2A:
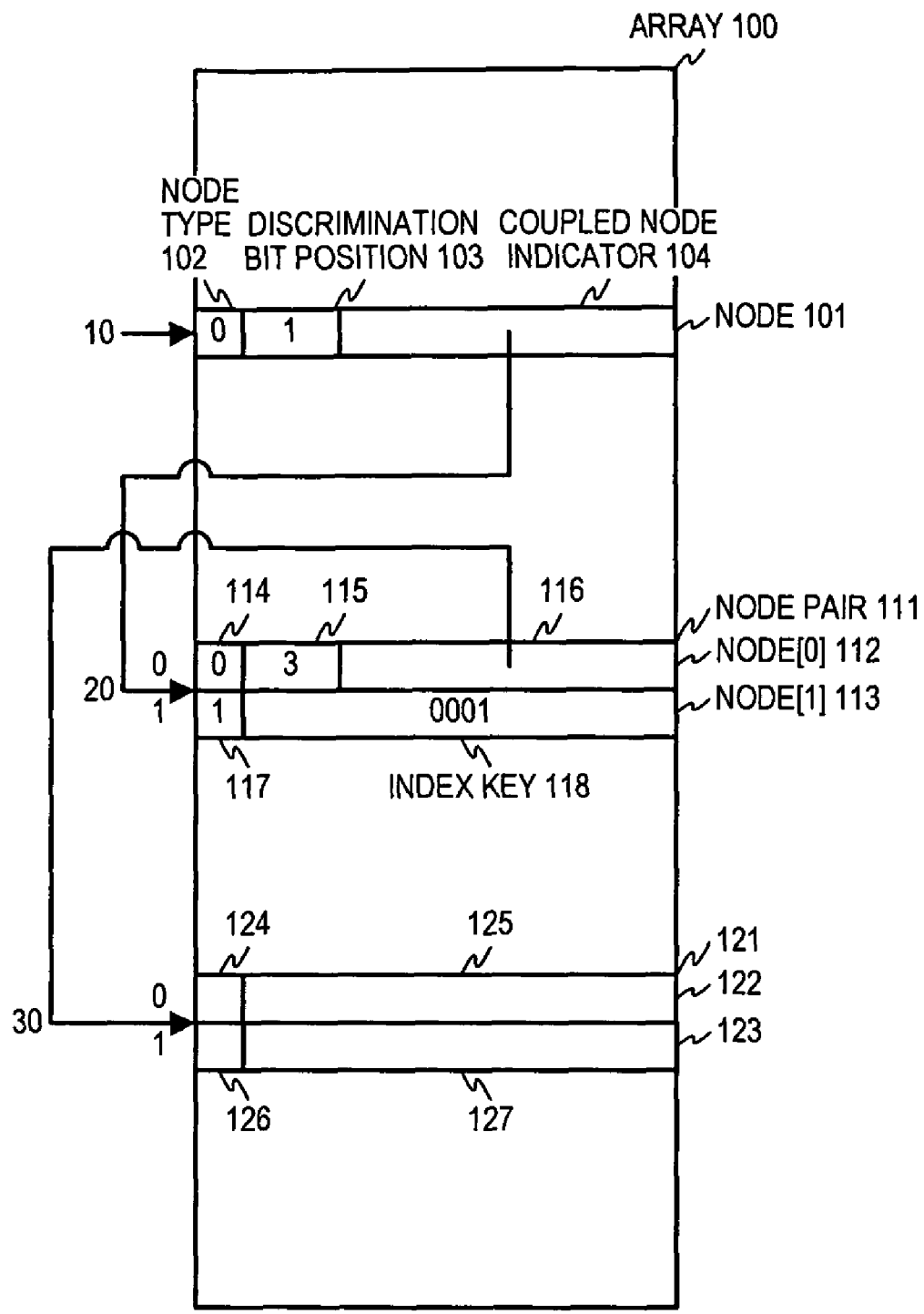
FIG. 2A is a drawing describing an exemplary configuration of a coupled node tree stored in an array.

FIG. 2A is a drawing that describes an exemplary configuration of a coupled node tree that is stored in an array.

Referring to FIG. 2A, a node 101 is located at the array element of the array 100 with the array element number 10. The node 101 is formed by a node type 102, a discrimination bit position 103, and a coupled node indicator 104. The node type 102 is 0, which indicates that the node 101 is a branch node. The value 1 is stored in the discrimination bit position 103. The coupled node indicator 104 has stored in it the array element number 20 of the primary node of the node pair of the link target. To simplify notation hereinafter, the array element number stored in a coupled node indicator is sometimes called the coupled node indicator. Also, the array element number stored in a coupled node indicator is sometimes expressed as the code appended to that node or the code attached to a node pair.

The array element having the array element number 20 has stored therein a node [0]112, which is the primary node of the node pair 111. The secondary node [1]113 forming a pair with the primary node is stored into the next, adjacent, array element (array element number 20+1). The value 0 is stored in the node type 114 of the node [0]112, the value 3 is stored in the discrimination bit position 115, and the value 30 is stored in the coupled node indicator 116. The value 1 is stored in the node type 117 of the node [1]113, thereby indicating that the node 1[113] is a leaf node. The value "0001" is stored in the index key 118. In the same manner as in a Patricia tree described above, although information for accessing a record corresponding to an index key is of course included in a leaf node, this is omitted from the notation.

Primary nodes are indicated as the node [0], and secondary nodes that are paired therewith are indicated as the node [1].

The contents of the node pair 121 formed by the node 122 and the node 123 that are stored in the array elements having array element numbers 30 and 31 are not shown.

The 0 or 1 that is appended to the node [0]112, the node [1]113, the node 122, and the node 123 indicates respectively to which node of the node pair linking is to be done when performing a search using a search key. Linking is done to the node having an array element number that is derived by adding the 0 or 1, which is the bit value of the search key at the discrimination bit position of the immediately previous branch node, to the coupled node indicator of the branch node.

Therefore, by adding the bit value of the discrimination bit position of the search key to the coupled node indicator of the immediately previous branch node, it is possible to determine the array element number of an array element storing a node at the link target.

Although in the above-noted example the smaller of the array element numbers at which the node pair is located is used as the coupled node indicator, it will be understood that it is also possible to use the larger of the array element numbers in the same manner.

Figure 1:
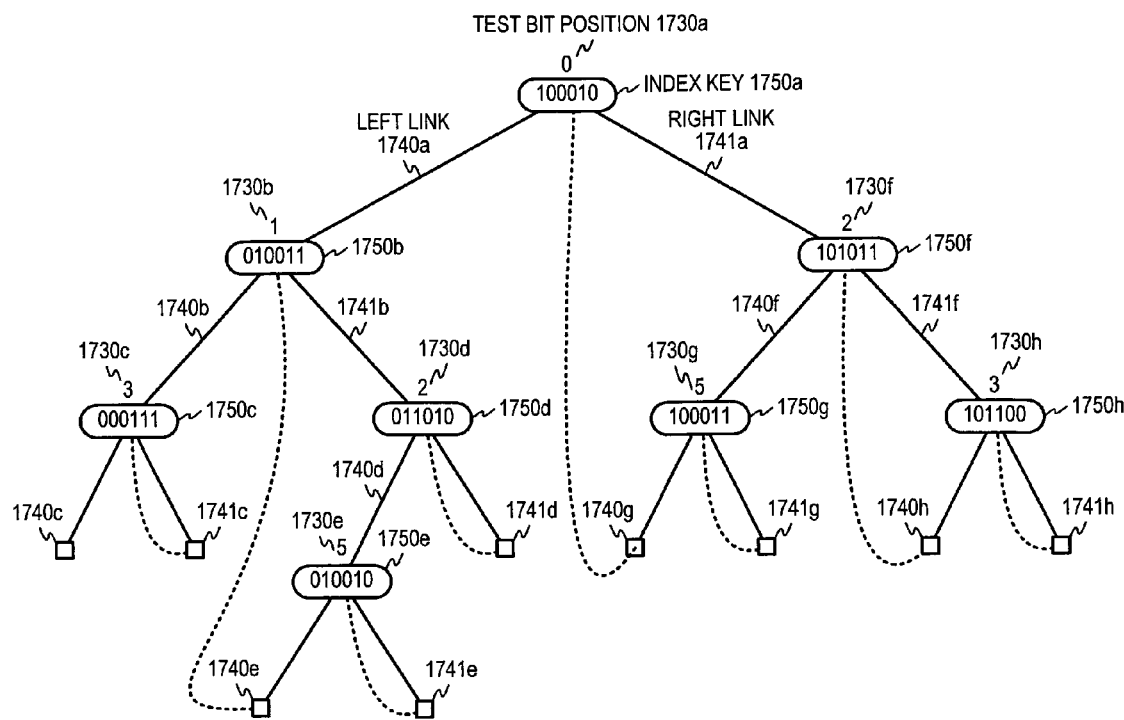
FIG. 1 is a drawing describing an example of a Patricia tree used in searching in the conventional art.
Figure 2B:
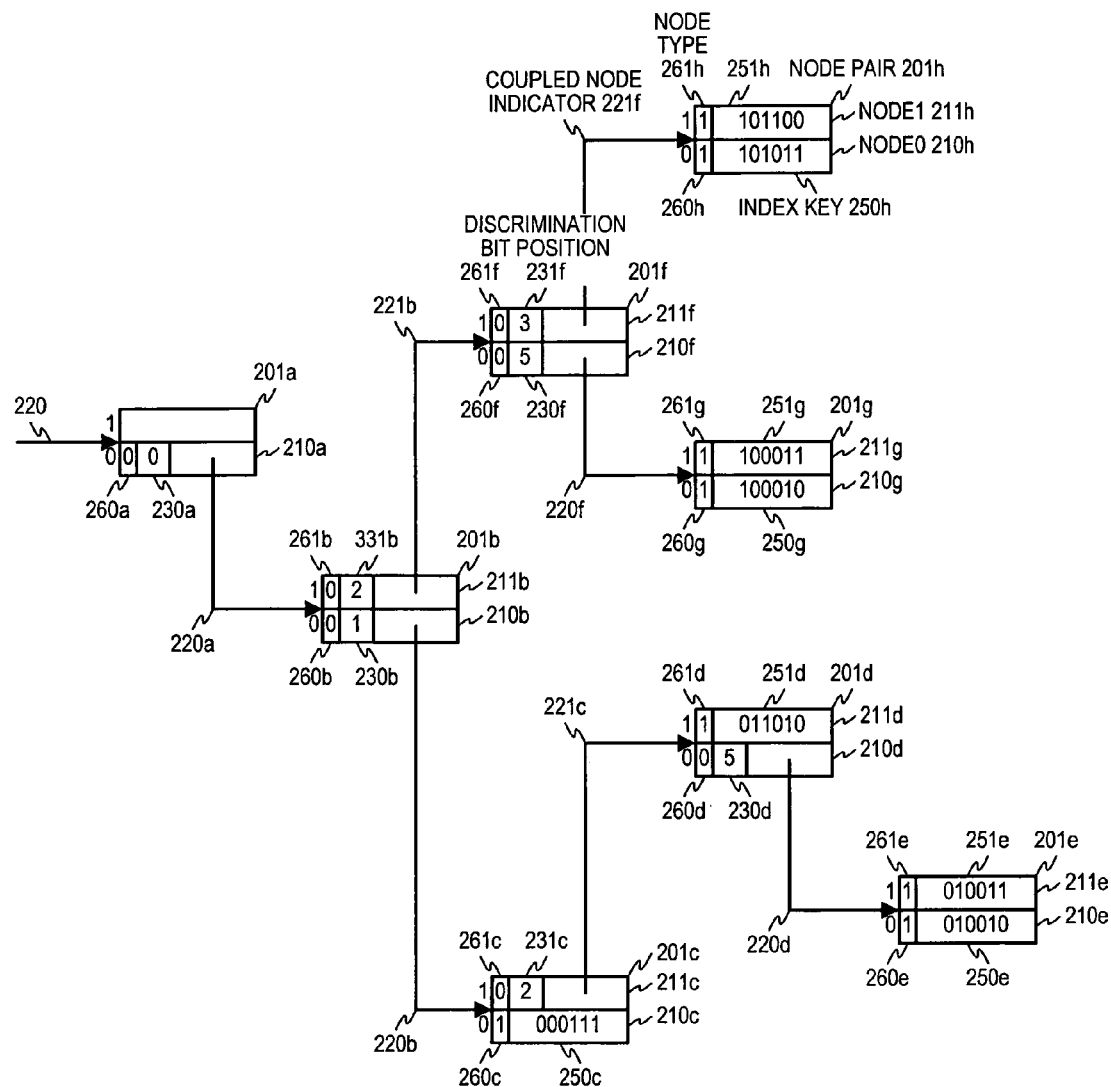
FIG. 2B is a drawing describing a tree structure of a coupled node tree.

FIG. 2B is a drawing that conceptually shows a tree structure of a coupled node tree. The 6-bit index key that is illustrated is the same that of the Patricia tree shown as an example in FIG. 1.

The reference numeral 210a shows the root node. In the example shown, the root node 210a is the primary node of the node pair 201a located at the array element number 220.

In this tree structure, a node pair 201b is located below the root node 210a, and below that are located the node pair 201c and the node pair 201f. Below the node pair 201f are located the node pair 201h and the node pair 201g. Below the node pair 201c is located the node pair 201d, and below the node pair 201d is located the node pair 201e.

The 0 or 1 code that is appended before each node is the same as the codes that are appended before the array element numbers described in FIG. 2A. The tree is traversed in accordance with the bit values at discrimination bit positions of the search key, so that the leaf node of the search for item is found.

In the example shown, the node type 260a of the root node 210a is 0, thereby indicating that this is a branch node, and the discrimination bit position 230a indicates 0. The coupled node indicator is 220a, which is the array element number of the array element in which the primary node 210b of the node pair 201b is stored.

The node pair 201b is formed by the node 210b and the node 211b, the node types 260b and 261b thereof both being 0, indicating branch nodes. The discrimination bit position 230b of the node 210b has 1 stored therein, and in the coupled node indicator of the link target is stored the array element number 220b of the array element in which is stored the primary node 210c of the node pair 201c.

Because 1 is stored in the node type 260c of the node 210c, this node is a leaf node, and thus includes an index key. "000111" is stored in the index key 250c. The node type 261c of the node 211c is 0, the discrimination bit position 231c of the node 211c is 2, and in the coupled node indicator is stored the array element number 221c of an array element in which is stored the primary node 210d of the node pair 201d.

The node type 260d of the node 210d is 0, the discrimination bit position 230d of the node 210d is 5, and in the coupled node indicator is stored the array element number 220d of an array element in which is stored the primary node 210e of the node 201e. The node type 261d of the node 211d that is paired with the node 210d is 1, and "011010" is stored in the index key 251d.

The node types 260e and 261e of the nodes 210e and 211e of the node pair 201e are both 1, indicating that both are leaf nodes. In the index keys 250e and 251e of each are stored "010010" and "010011" respectively as index keys.

The discrimination bit position 231b of the node 211b, which is the other node of the node pair 201b, has 2 stored therein, and the array element number 221b of the array element in which is stored the primary node 210f of the node pair 201f is stored in the coupled node indicator of the link target.

The node types 260f and 261f of the nodes 210f and 211f of the node pair 201f are both 0, indicating that both are branch nodes. In the discrimination bit positions 230f and 231f of each are stored 5 and 3, respectively. The array element number 220f of the array element in which is stored the primary node 210g of the node pair 201g is stored in the coupled node indicator of the node 210f, and the array element number 221f of an array element in which is stored the node [0]210h, which is the primary node of the node pair 201h, is stored in the coupled node indicator of the node 211f.

The node types 260g and 261g of the nodes 210g and 211g of the node pair 201g are both 1, indicating that both are leaf nodes, and "100010" and "100011" are stored in the index keys 250g and 251g thereof, respectively.

In the same manner, the node types 260h and 261h of the node [0]210h of the node pair 201h, and the node [1]211h, which is paired therewith, are both 1, indicating that both are leaf nodes, and "101011" and "101100" are stored in the index keys 250h and 251h thereof, respectively.

The processing flow in searching for the index key "100010" from the above-noted tree is briefly described below. The discrimination bit positions are numbered 0, 1, 2, . . . and so on from the left.

First, processing is started from the root node 201a using the bit string "100010" as the search key. Because the discrimination bit position 230a of the root node 210a is 0, examining the bit value of the discrimination bit position 0 reveals 1. This being the case, 1 is added to the array element number 220a stored in the coupled node indicator and linking is done to the node 211b stored in the resulting array element number. Because 2 is stored in the discrimination bit position 231b of the node 211b, examination of the bit value of the discrimination bit position 2 reveals 0, resulting in linking to the node 210f stored in the array element having the array element number 221b stored in the coupled node indicator.

Because 5 is stored in the discrimination bit position 230f of the node 210f, and because examination of the bit value of the discrimination bit position 5 of the search key "100010" reveals 0, linking is done to the node 210g stored in the array element having the array element number 220f stored in the coupled node indicator.

Because the node type 260g of the node 210g is 1, indicating a leaf node, the index key 250g is read out and a comparison is performed with the search key, thereby revealing coincidence between the two, both of which are "100010". Searching is performed in this manner using the coupled node tree.

Next, the significance of the configuration of the coupled node tree will be described, with reference made to FIG. 2B.

The configuration of the coupled node tree is defined according to a set of index keys. In the example of FIG. 2B, the discrimination bit position of the root node 210a is 0 because there is an index key having a 0 at the 0th bit and an index key having a 1 at the 0th bit in the index keys shown in the example of FIG. 2B. The group of index keys having 0 at the 0th bit is classified under the node 210b, and the group of index keys having 1 at the 0th bit is classified under the node 211b.

That the discrimination bit position of the node 211b is 2 reflects a property of the index keys, this being that the 1st bits of all the nodes 211h, 210h, 211g, and 210g are the same value 0, a difference therebetween first occurring at the 2nd bit.

Similar to the case of the 0th bit, the cases of the 2nd bit being 1 are classified on the node 211f side, and the cases of the 2nd bit being 0 are classified on the node 210f side.

Because index keys having a 2nd bit that is 1 differ with regard to the 3rd bit, 3 is stored in the discrimination bit position of the node 211f, and because the 3rd and 4th bits of index keys having 0 as the 2nd bit are the same and differ at the 5th bit, 5 is stored in the discrimination bit position of the node 210f.

At the link target of the node 211f, because there is only one having a 3rd bit of 1 and one having a 3rd bit of 0, nodes 210h and 211h are leaf nodes, with "101011" and "101100" stored in the index keys 250h and 251h, respectively.

Even in the event that the index key set includes "101101" or "101110" in place of "101100," because there is equality with "101100" up until the 3rd bit, only the index key stored in the node 211h would change, there being no change in the structure of the tree itself. However, if "101101" is included in addition to "101100," the node 211h would become a branch node, the discrimination bit position thereof being 5. If the index key to be added is "101110," the discrimination bit position would be 4.

As described above, the coupled node tree structure is determined by the bit values of each bit position of the index keys included in the set of index keys. When searching using a search key, the index key is followed over a path disposed on a coupled node tree, and in the case, for example of a search key "101100" it is possible to reach the node 211h. As can be imagined from the above-noted description, even if the search key is made "101101" or "101110," the node 211h will be reached, and a comparison with the index key 251h will result in the search failing.

Also, even in the case in which searching is done with "100100," in the link path of nodes 210a, 211b, and 210f, because the 3rd and 4th bits of the search key are not used and the 5th bit is 0, the node 210g will be reached, similar to the case searching with "100010." In this manner, the discrimination bit positions are used in accordance with bit makeup of the index keys stored in the coupled node tree to perform branching.

The detailed search algorithm and the coupled node tree configuration with respect to an index key set will be described later in detail.

Figure 3:
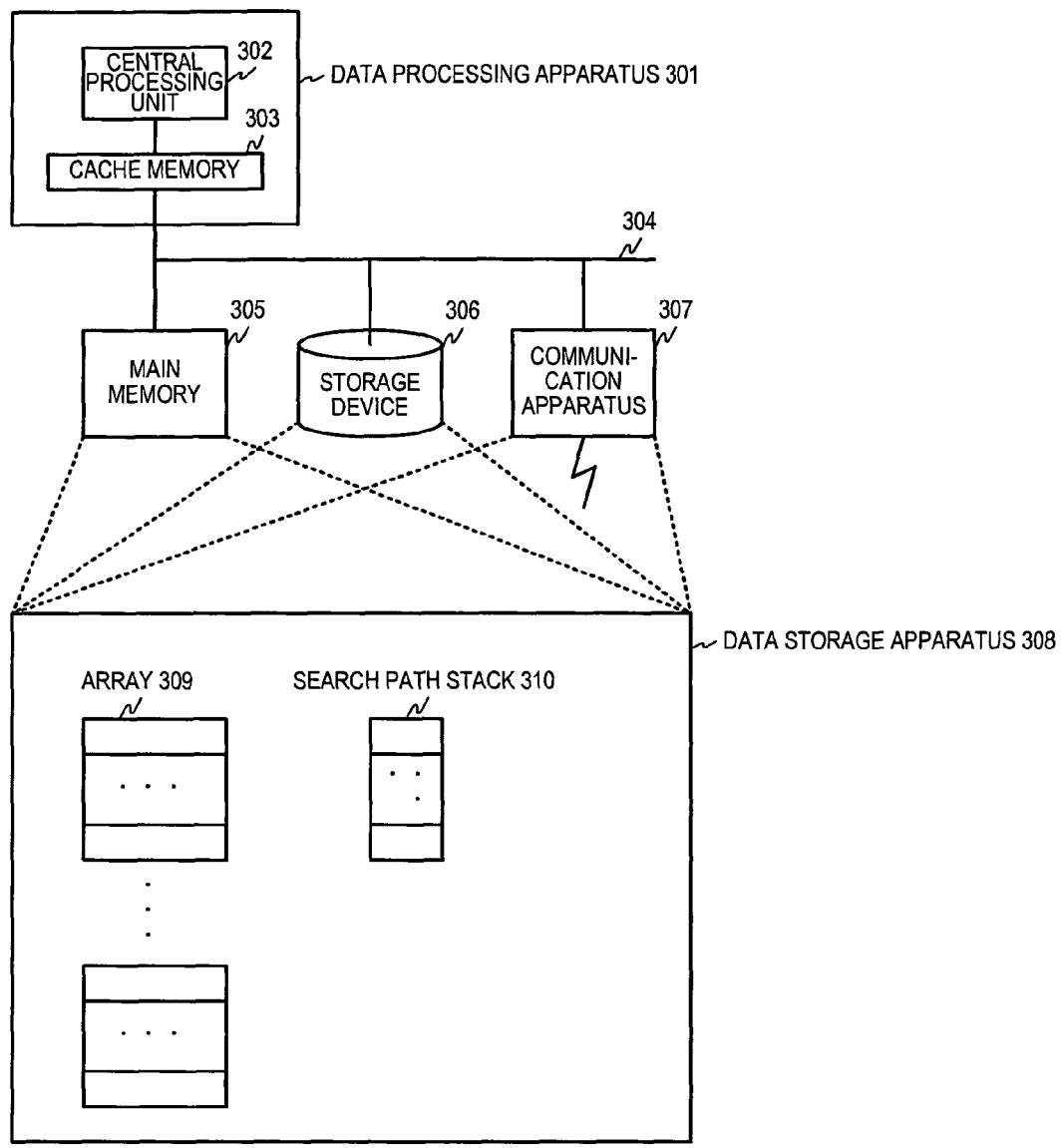
FIG. 3 is a drawing describing an exemplary hardware configuration for embodying the present invention.

FIG. 3 is a drawing describing an example of a hardware configuration for embodying the present invention.

Search processing and data maintenance are implemented with the searching apparatus of the present invention by a data processing apparatus 301 having at least a central processing unit 302 and a cache memory 303, and a data storage apparatus 308. The data storage apparatus 308, which has an array 309 into which is disposed a coupled node tree, and a search path stack 310, into which are stored array element numbers of nodes which are traversed during the search, can be implemented by a main memory 305 or a storage device 306, or alternatively, by using a remotely disposed apparatus connected via a communication apparatus 307.

In the example shown in FIG. 3, although the main memory 305, the storage device 306, and the communication apparatus 307 are connected to the data processing apparatus 301 by a single bus 304, there is no restriction to this connection method. The main memory 305 can be disposed within the data processing apparatus 301, and can be implemented as hardware within the central processing unit 302. It will be understood that it is alternatively possible to select appropriate hardware elements in accordance with the usable hardware environment and the size of the index key set, for example, having the array 309 held in the storage device 306 and having the search path stack 310 held in the main memory 305.

Also, although it is not particularly illustrated, a temporary memory area can of course be used to enable various values obtained during processing to be used in subsequent processing.

Figure 4:
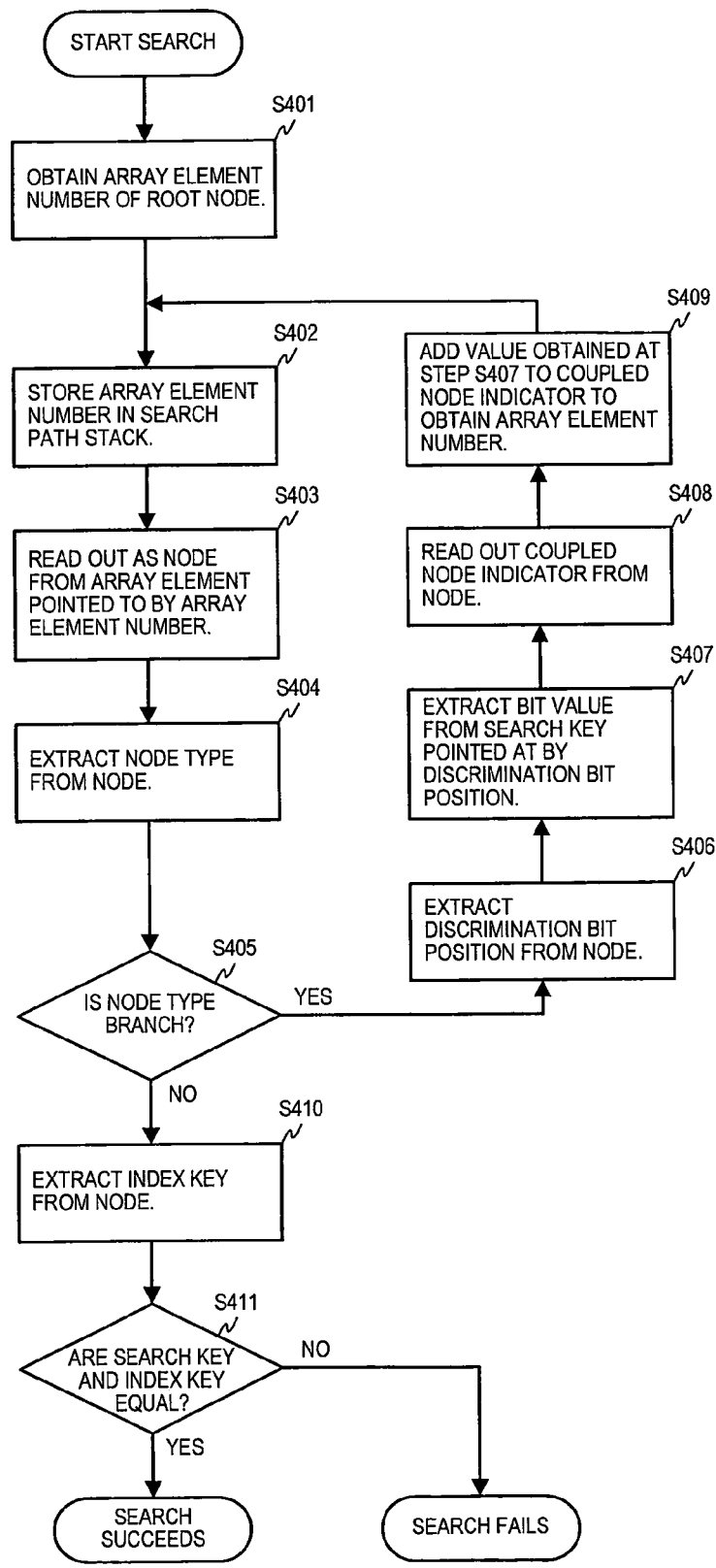
FIG. 4 is a flowchart showing the search processing in an embodiment of the present invention.

FIG. 4 is a flowchart showing search processing in an embodiment of the present invention. The algorithm for search processing will be described with reference made to FIG. 2B when appropriate.

In starting the search processing, the array element number of the root node of the coupled node tree that is to be searched is acquired (step S401). Because the coupled node tree can be identified by the array element number of the root node thereof, it is possible to manage the coupled node tree by using the array element number of the root node. This being the case, the array element number of the root node is registered into a coupled node tree management means.

It is clear that the illustrated search processing can be implemented by a program in a computer. The coupled node tree management means can, for example, be a storage area of a search processing program for execution by the computer.

Also, in the case in which a plurality of search systems which use a coupled node tree are embodied on a computer system, it is possible to hold the management means external to each individual search program.

The above corresponds to the acquisition of the array element number 220 in the example of FIG. 2B. The acquisition of an array element number of the root node is not restricted to the above-noted method, and can alternatively be performed, for example, by direct input of the array element number from a keyboard or the like, or by setting as a fixed value within a program.

Next, at step S402, the array element number acquired at step S401 is stored on the search path stack. Proceeding to step S403, the array element of the array element number on the topmost part of the search path stack is read out as a node. At step S404, the node type is extracted from the node read out at step S403.

Next at step S405, a judgment is made as to the node type. If the judgment made at step S405 is that the node type is a branch node, processing proceeds to step S406. At step S406, the discrimination bit position is extracted from the node. Next, at step S407, the bit value of the search key at the discrimination bit position extracted at step S406 is obtained. Next, proceeding to step S408, the array element number of the primary node of the node pair of the link target is obtained from the node. Then, proceeding to step S409, the bit value obtained at step S407 is added to the array element number obtained at step S408, thereby obtaining the array element number of the link target node, and return is made to step S402.

At step S402, the array element number obtained at step S409 is stored on the search path stack.

The above-described loop processing from step S402 to step S409 is repeated until the judgment at step S405 is leaf node.

At step S405 if the node type is determined to be a leaf node, processing proceeds to step S410, at which the index key is extracted from the node. Then, proceeding to step S411, a judgment is made as to whether or not the search key and the index key are equal. If they are equal, the search succeeds, but if they are not equal, the search fails.

In the above description, although a stack is used in order to identify the array element number of a node being processed, for searching only, it is also possible to use a normal working area as temporary storage. However, because the use of a stack is effective in the insertion processing to be described, it is preferable that a stack be used in search processing as well.

Figure 5:
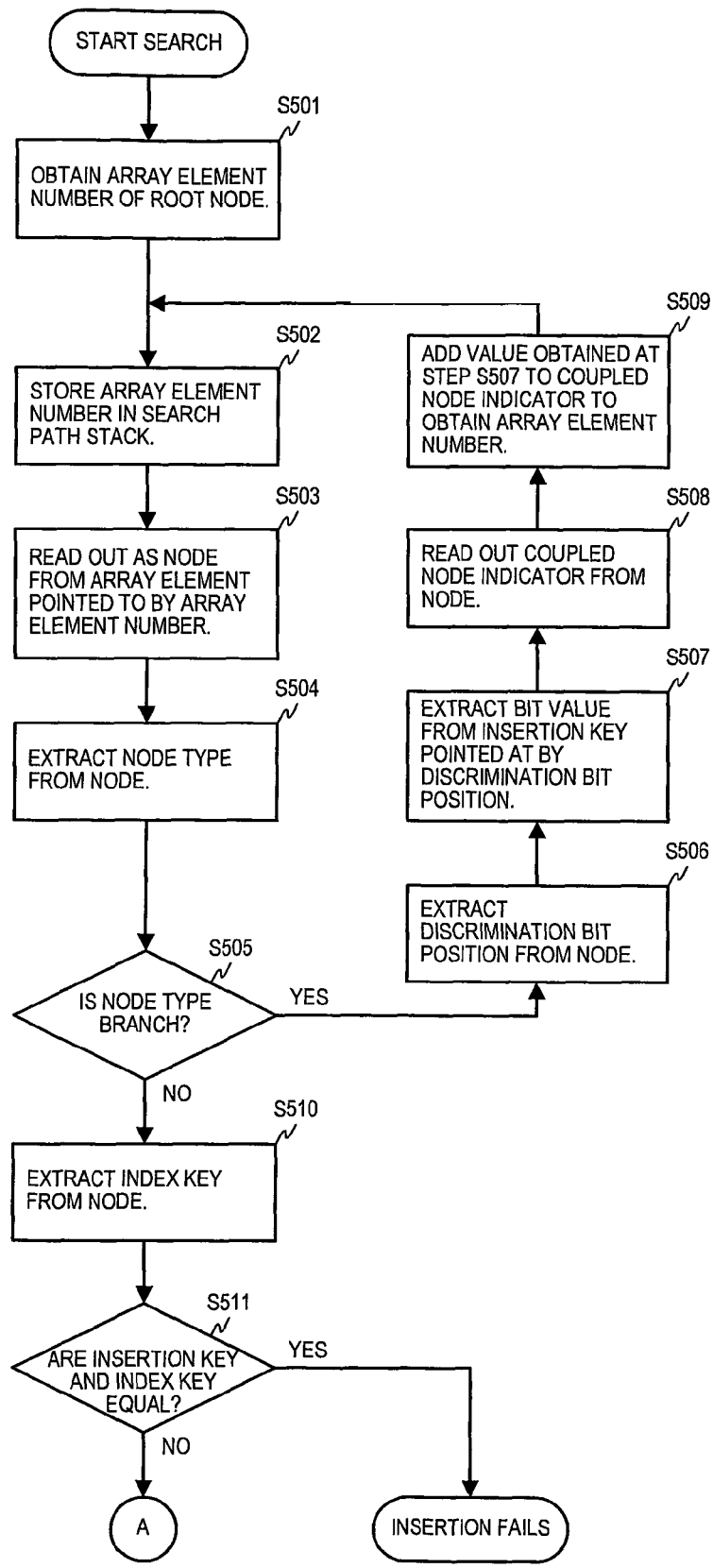
FIG. 5 is a drawing showing the flow of search processing, which is the first part of the insertion processing in an embodiment of the present invention.
Figure 6:
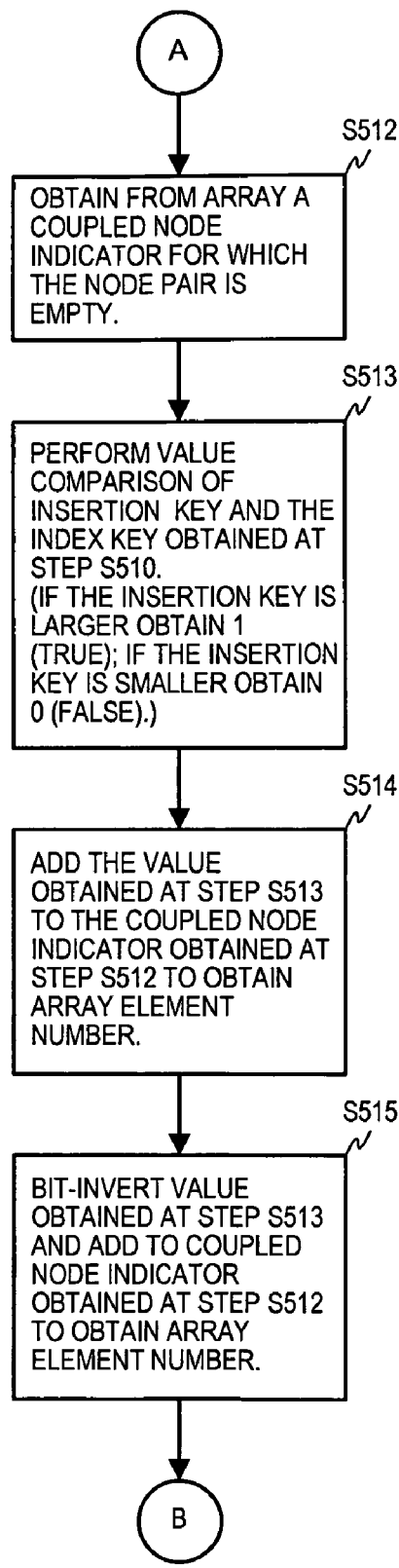
FIG. 6 is a drawing describing the processing flow for preparing array elements for a node pair to be inserted in insertion processing in an embodiment of the present invention.
Figure 7:
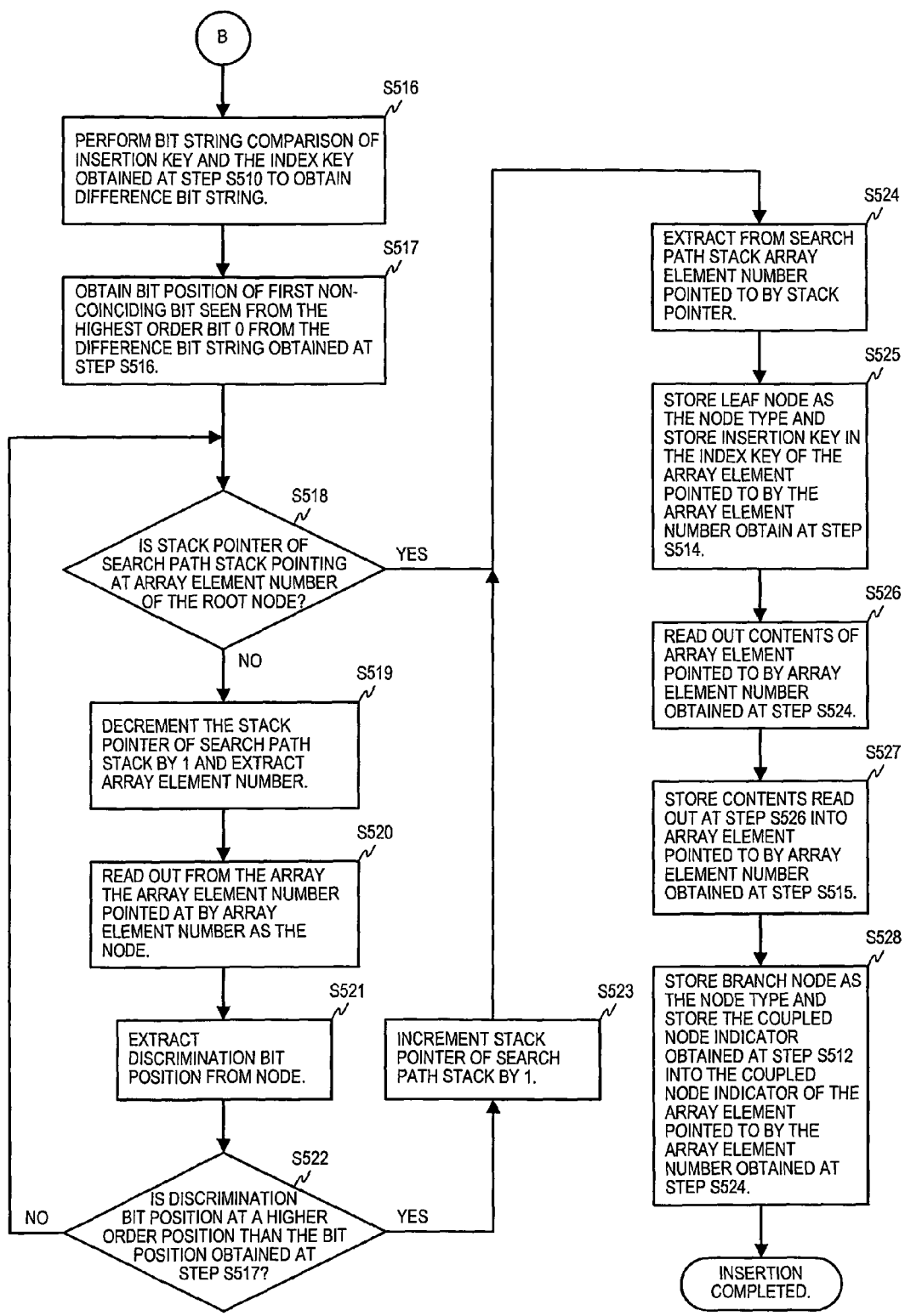
FIG. 7 is a drawing showing the processing flow for determining the position at which a node pair is to be inserted, and the storing of the content of each node of the node pair to complete the insertion processing.

Next, FIG. 5 to FIG. 8 will be used to describe node insertion processing in a coupled node tree. FIG. 5 to FIG. 7 describe the usual insertion processing, and FIG. 8 describes the processing for insertion of a root node. By root node insertion processing and usual insertion processing, because a coupled node tree is generated, the description of the node insertion processing is also a description of the processing to generate a coupled node tree.

FIG. 5 is a drawing showing the processing flow for search processing, which is the first stage of insertion processing, this corresponding to the using of an insertion key as a search key in the search processing shown in FIG. 4. Because the processing of step S501 to step S510 corresponds completely to step S401 to step S410 of FIG. 4, these steps will not be described herein.

At step S511 in FIG. 5, a comparison is performed between the insertion key and the index key and, because if there is equality the insertion key already exists in the coupled node tree, the insertion fails, and processing ends. If, however, there is no equality, processing proceeds to step S512 and thereafter in FIG. 6.

FIG. 6 is a processing flowchart describing the processing to prepare an array element for a node pair to be inserted.

At step S512, an empty node pair is determined from the array, and the array element number of the array element to be made the primary node is acquired from the node pair.

Proceeding to step S513, a value comparison is performed between the insertion key and the index key acquired at step S510 and, in the case in which the insertion key is larger, the Boolean value 1 is obtained, but if the insertion key is smaller, the Boolean value 0 is obtained.

Proceeding to step S514, the Boolean value obtained at step S513 is added to the array element number of the primary node obtained at step S512 to obtain an array element number.

Proceeding to step S515, the logical negation value of the Boolean value obtained at step S513 is added to the array element number of the primary node obtained at step S512 to obtain an array element number.

The array element number obtained at step S514 is the array element number of the array element into which a leaf node having the insertion key as an index key is stored, and the array element number obtained at step S515 is the array element number of the array element into which a node that forms a pair with that leaf node is stored.

That is, by means of the value relationship between the index key stored in the leaf node obtained by the first stage of search processing and the insertion key, a determination is made into which node of the node pair the leaf node holding the insertion key is to be inserted.

For example, in the case in which "011011" is to be inserted into the coupled node tree of FIG. 2B, the index key resulting from the search is the "011010" that is stored in node 211d. A Boolean value is obtained by performing a value comparison between the insertion key "011011" and the index key "011010" stored in the node 211d, and, in this example, because the insertion key is larger, the Boolean value 1 is obtained, so that the leaf node that holds the insertion key is stored in an array element having an array element number obtained by adding 1 to the coupled node indicator of the node pair to be inserted. The index key "011010" is stored in an array element having an array element number obtained by adding the logical negation value of the Boolean value obtained by the value comparison to the coupled node indicator.

When this is done, because the index key "011010" and the insertion key "011011" differ at the 5th bit, the node 211d is a branch node, with a discrimination bit position of 5, whose coupled node indicator is the array element number of the primary node of the inserted node pair.

In the case also in which "011001" is to be inserted into the coupled node tree of FIG. 2B, the index key resulting from the search is "011010" that is stored in node 211d. In this case, because the insertion key is smaller, the Boolean value 0 is obtained, so that the leaf node that holds the insertion key is stored in an array element having an array element number obtained by adding 0 to the coupled node indicator of the node pair to be inserted. Then, because the index key "011010" and the insertion key "011001" differ at the 4th bit, the node 211d is a branch node with a discrimination bit position of 4, whose coupled node indicator is the array element number of the primary node of the inserted node pair. Next, processing proceeds to the processing of step S516 and thereafter in FIG. 7.

FIG. 7 is a drawing showing the processing flow of storing a node in the array prepared as shown in FIG. 6, determining the insertion position therein, and changing the contents of an existing node to complete to the insertion processing.

The processing from step S516 to step S523 is processing to determine the position on the coupled node tree for insertion of a node pair, and the processing of step S524 and thereafter is processing for setting data in each node and completing the insertion processing.

At step S516, an exclusive-OR, for example, is obtained of the insertion key and the index key obtained at step S510 so as to obtain a difference bit string.

Proceeding to step S517, from the difference bit string obtained at step S516 the first bit position starting from the most-significant 0th bit at which there is a non-coincidence is obtained. This processing can be performed by, for example, a CPU having a priority encoder, the difference bit string being input thereto and the difference bit positions being obtained. It is alternatively possible to perform the equivalent processing using software, to obtain the first bit position at which there is non-coincidence.

Next, proceeding to step S518, a determination is made as to whether the stack pointer of the search path stack is pointing at the array element number of the root node. If it is, processing proceeds to step S524, but if it is not processing proceeds to step S519.

At step S519, the stack pointer of the search path stack is decremented by 1, and the array element number stacked at that point is extracted.

Proceeding to step S520, the array element at the array element number extracted at step S519 is read out as a node.

Proceeding to step S521, the discrimination bit position is extracted from the node read out at step S520.

Next, proceeding to step S522, a judgment is made as to whether the discrimination bit position read out at step S521 is of higher order than the bit position obtained at step S517. In this case, the term higher order means more to the left in the bit string, that is, having a lower bit position value.

If the result of the judgment at step S522 is negative, return is made to step S518, and repetition is done until either the judgment at step S518 is affirmative or the judgment at step S522 is affirmative. When an affirmative judgment results at step S522, at step S523 the stack pointer of the search path stack is incremented by 1, and processing proceeds to the processing of step S524 and thereafter.

In the above-described processing at step S516 to step S523, in order to determine the position of insertion of a node pair, a bit string comparison is performed between the index key that is to be inserted and index key obtained by searching, and then a check is made of the relative positional relationship between the leading (most significant) bit position at which the bit value is different in the bit string comparison and the discrimination bit position of branch nodes whose array element numbers are stored in the search path stack. The next branch node link target of the branch node at which the discrimination bit position is a more significant is made the insertion position for the node pair to be inserted.

For example, when inserting "111000" into the coupled node tree of FIG. 2B, the index key resulting from the search is the "101011" stored in the node 210h. A bit string comparison between the insertion key "111000" and the index key "101011" stored in the node 210h obtains the bit position 1 as the most significant bit position of a bit value that is different. The search path stack is successively traversed in reverse until the relative position relationship between the obtained bit position 1 and the discrimination bit position of the branch node stored in the array element having an array element number stored in the search path stack is such that the discrimination bit position is more significant, so that the root node 210a is reached. At that point the search path stack pointer is incremented by 1 to obtain the array element number of the node 211b. The insertion key "111000" is inserted into the link target of the node 211b.

If the root node is reached by traversing the search path stack in reverse but the discrimination bit position of the root node is not a bit position that is more significant than the bit position of the most significant bit having a different bit value in the previously determined bit string comparison, this is the case in which at the upper-order bit of the index key of the coupled node tree the bits that are more significant than the discrimination bit position of the root node all have equal values. This means that in the index key to be inserted, there is the first bit value that differs with the value of a bit that is more significant that the discrimination bit position of the root node. Therefore, the node pair to be inserted becomes the direct link target of the root node, and the discrimination bit position of the root node changes to the position of the most significant bit of the insertion key, which differs in value from the existing index key.

Next, the processing of step S524 and thereafter, which is the processing to set data at each node and complete the insertion processing, will be described.

At step S524, the array element number that is pointed to by the stack pointer of the search path stack is extracted.

At step S525, 1 (leaf node) is stored in the node type of the array element pointed to be the array element number obtained at step S514 and the insertion key is stored in the index key.

Proceeding to step S526, the array element at the array element number obtained at step S524 is read out from the array.

Next, at step S527, the contents read out at step S526 are stored in the array element having the array element number obtained at step S515.

Finally, at step S528, 0 (branch node) is stored in the node type of the array element pointed to by the array element number obtained in step S524, the bit position obtained at step S517 is stored in the discrimination bit position, and the array element number obtained at the step S512 is stored in the coupled node indicator.

In the above-described example of inserting "111000" into the coupled node tree of FIG. 2B, the contents of node 211*b* are written into the node[0] of the empty node pair that was obtained (step S527) and the node[1] thereof was made a leaf node that holds "111000" (step S525). The bit position 1 of the most significant bit that is the bit value that differs in the bit string comparison is stored in the discrimination bit position of the node 211*b*, and the array element number of the array element where the primary node of the obtained node pair is located is stored into the coupled node indicator of the node 211*b* (step S528).

Figure 8:
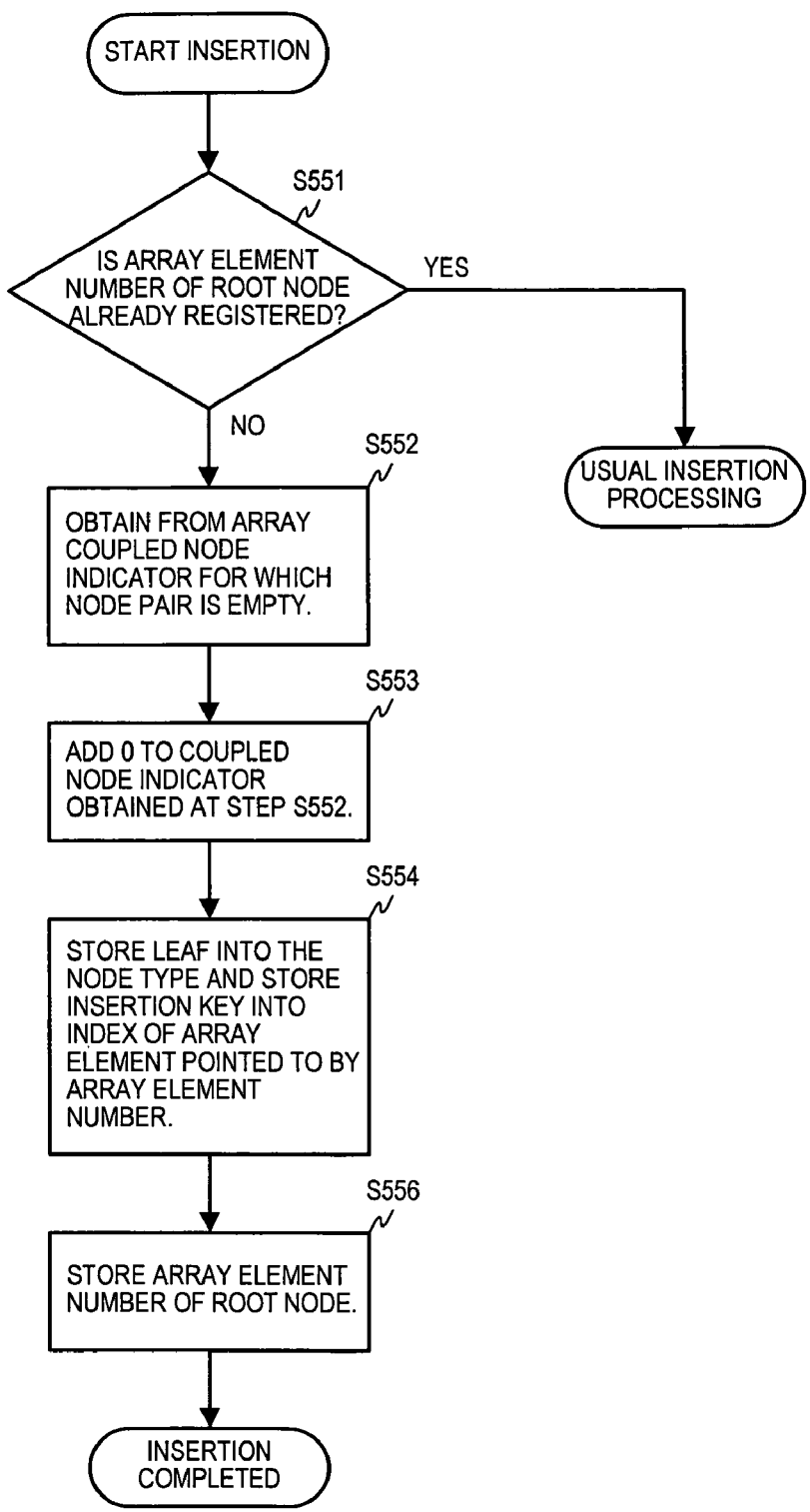
FIG. 8 is a processing flow diagram describing the overall node insertion processing for a case in which an index key is added, including root node insertion processing, in an embodiment of the present invention.

FIG. 8 is a processing flow diagram describing the overall node insertion processing for the case in which an index key is to be inserted, including processing for insertion of a root node, in an embodiment of the present invention.

At step S551, a judgment is made as to whether the array element number of a root node of a coupled node tree that is to be obtained has already been registered. If it has already been registered, the usual insertion processing described using FIG. 5 to FIG. 7 is performed.

At step S551, if the judgment is that the registration has not yet been done, this is the case of the generation and registration of a completely new coupled node tree.

First, at step S552, an empty node pair is requested from the array, and the array element number of the array element to be made the primary node is acquired from the node pair. Next at step S553, the array element number is determined by adding 0 to the array element number obtained at step S552. (In actuality, this is equal to the array element number obtained at step S552). Further, at step S554, 1 (leaf node) is stored in the node type of the root node of the array element having the array element number obtained at step S553, and the insertion key is stored in the index key, and at step S556 the processing is completed by registering the array element number of the root node obtained at step S552.

As described above, it will be understood that when there is a set of index keys, the index keys are successively extracted therefrom, and the processing of FIG. 8 and FIG. 5 to FIG. 7 is repeated so as to enable the creation of a coupled node tree according to the present invention corresponding to the set of index keys.

Next, referring to FIG. 9 and FIG. 10, the processing flow for deleting a specific index key from a set of index keys associated with a coupled node tree in an embodiment of the present invention will be described.

Figure 9:
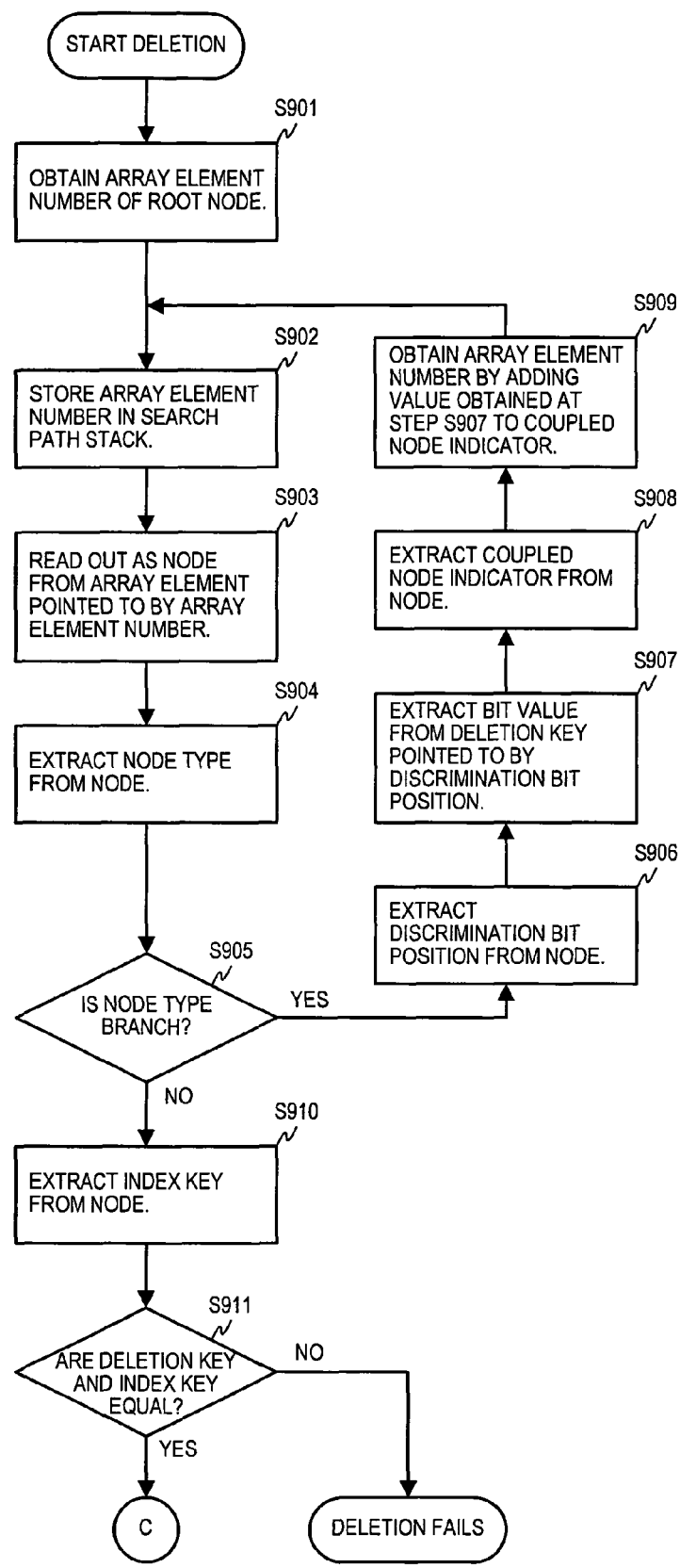
FIG. 9 is a drawing showing the processing flow for search processing, which is the first part of deletion processing in an embodiment of the present invention.

FIG. 9 is a drawing showing the processing flow for search processing, which is the first stage of deletion processing, this corresponding to the using of a deletion key as the search key in the searching processing shown in FIG. 4. Because the processing of step S901 to step S910 corresponds completely to step S401 to step S410 of FIG. 4, these steps will not be described herein.

In step S911 in FIG. 9, a comparison is performed between the deletion key and the index key and, because if there is no equality the index key to be deleted does not exist in the coupled node tree, the deletion fails, and processing ends. If, however, there is equality, processing proceeds to step S912 and thereafter in FIG. 10.

Figure 10:
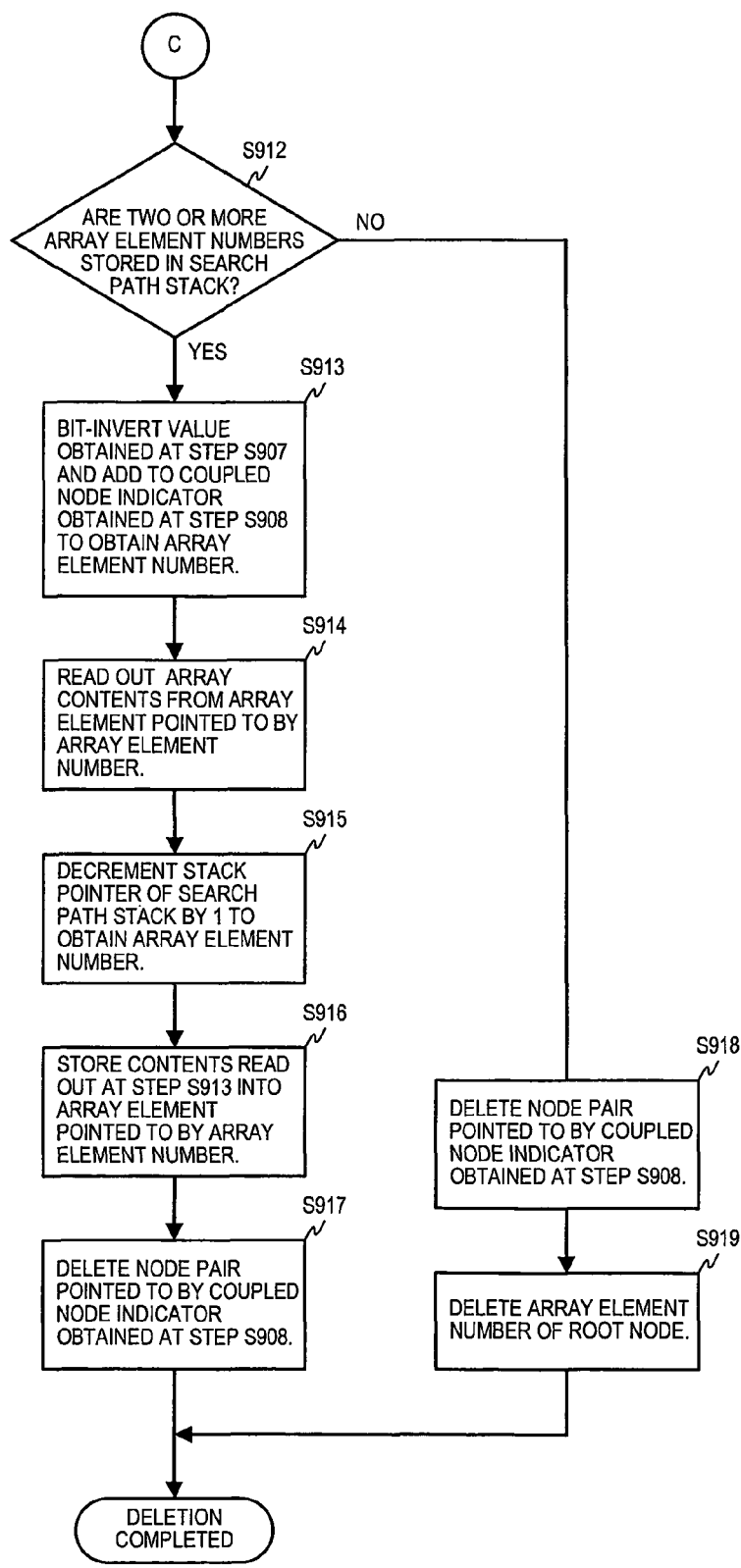
FIG. 10 is a drawing showing the processing flow for search processing, which is the second part of deletion processing in an embodiment of the present invention.

FIG. 10 is a drawing describing the processing flow of the latter stage of the deletion processing.

First, at step S912, a judgment is made as to whether or not there are at least 2 array element numbers on the search path stack. Stated differently, the condition in which there are fewer than 2 array element numbers is the one in which there is only 1, this being the array element number of the array element in which the root node is stored. In this case, processing proceeds to step S918, at which the node pair of the array element number of the root node obtained at step S901 is deleted. Next, proceeding to step S919, the array element number of the root node that had been registered is deleted, thereby completing the processing.

If at step S912 the judgment is made that there are two or more array element numbers stored in the search path stack, processing proceeds to step S913, at which an array element number is obtained by adding the inversion of the value obtained at step S907 to the coupled node indicator obtained at step S908. This processing is performed to determine the array element number of a node that forms a pair with a leaf node at which is stored the index key to be deleted.

Next, at step S914, the contents of the array element having the array element number obtained at step S913 are read out, and at step S915 the stack pointer of the search path stack is decremented by 1 and the array element number is extracted.

Next, at step S916, the contents of the array element having the array element read out at step S914 are written over the array element having the array element number obtained at step S915. This processing replaces the branch node that is the link source to the leaf node in which the index key to be deleted with the above-noted node that forms a pair with the leaf node.

Finally, at step S917, processing is completed by deleting the node pair associated with the coupled node indicator obtained in step S908.

Figure 11A:
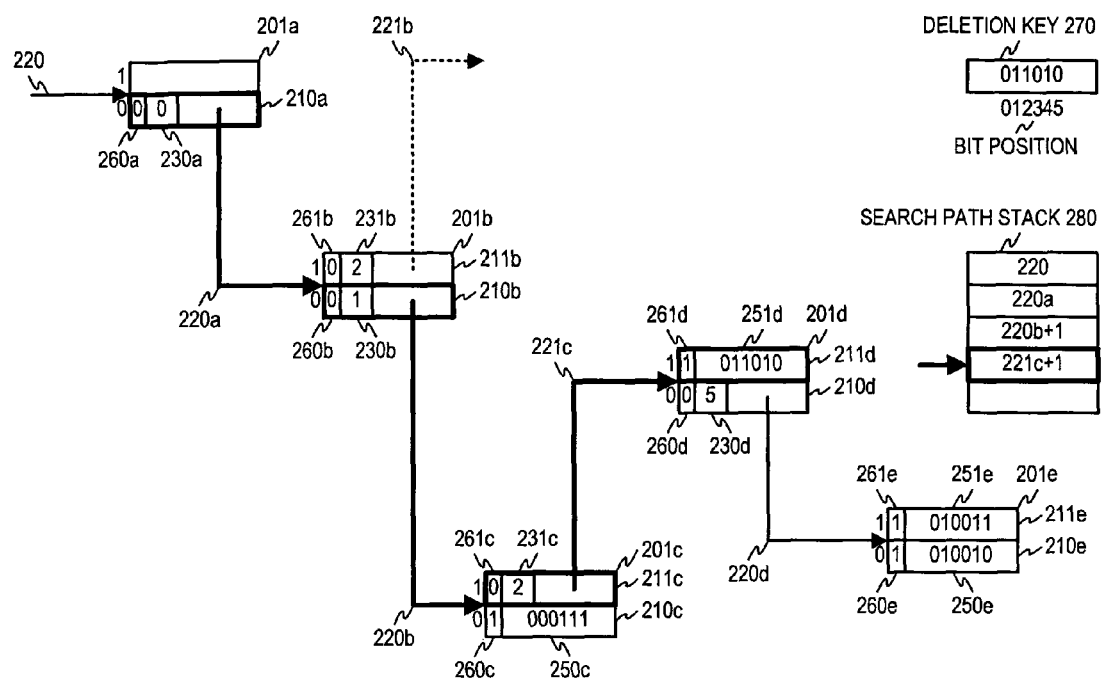
FIG. 11A is a drawing describing the coupled node tree and the deletion key "011010" before deletion processing.
Figure 11B:
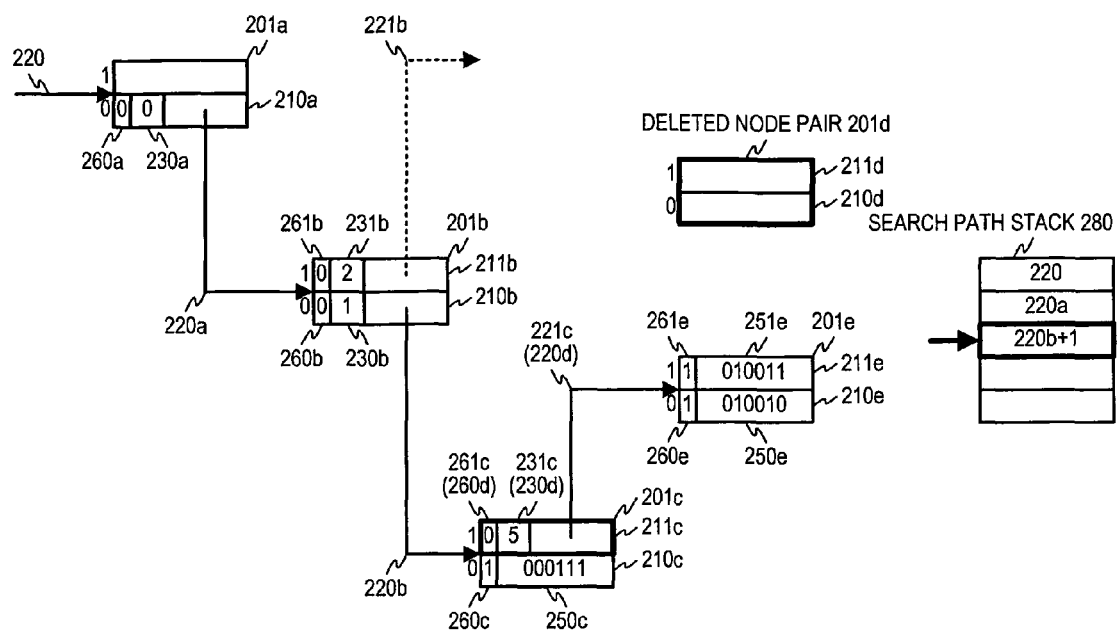
FIG. 11B is a drawing describing the coupled node tree after deletion processing.

FIG. 11A and FIG. 11B are drawings describing the deletion of the index key "011010" from the coupled node tree shown as the example in FIG. 2B.

In the coupled node tree shown in FIG. 11A, the nodes 201*f* and below are omitted. The index key "011010" that is to be deleted is stored in the deletion key 270, which is a temporary storage area. The stack pointer of the search path stack 280 points to the array element number 221*c*+1, this indicating that the search processing has been completed. Nodes enclosed by thick lines in the drawing are the nodes that are traversed by the search processing, the array element numbers thereof, from that of the root node 210*a* to that of the leaf node 211*d*, being stored in the search path stack 280.

In the search processing using a deletion key, first the array element number 220 of the root node 210*a* is obtained and stored in the search path stack 280. Because the discrimination bit position 230*a* of the root node 210*a* is 0 and the bit value of the bit position 0 of the deletion key is 0, the coupled node indicator 220*a*+0=220*a* is stored in the search path stack 280.

When this happens, the node 210*b* is read out and, because the discrimination bit position 230*b* is 1 and the bit value of the bit position 1 of the deletion key is 1, the coupled node indicator 220*b*+1 is stored in the search path stack 280.

Next, the node 211*c* is read out and, because the discrimination bit position 231*c* is 2 and the bit value of the bit position 2 of the deletion key is 1, the coupled node indicator 221*c*+1 is stored in the search path stack 280. Because the node type 261*d* of the node 211*d* stored in the array element having the array element number 221*c*+1 is 1, indicating that this is a leaf node, when the index key 251*d* is extracted the value thereof is "011010," this value coinciding with the index key that is to be deleted that is stored in the deletion key 270.

In the condition shown in FIG. 11A, the contents of the node 210*d* that forms a pair with the node 211*d* that has the index key that is to be deleted are read out, and those contents are stored in the array element (node 221*c*) having the array element number 220*b*+1 that is stored in the location pointed to by the stack pointer of the search path stack 280 after decrementing the pointer by 1. After that, the node pair 201*d* is deleted. After deletion of the node pair, the array element becomes empty, enabling its re-use.

The coupled node tree shown in FIG. 1B shows the condition after completion of the deletion processing. As shown by the reference symbols in parentheses, the node type 261*c*, the discrimination bit position 231*c*, and the coupled node indicator 221*c* of the node 211*c* are the values that had been stored in the node 210*d* as is.

Next, FIG. 12A, FIG. 12B, and FIG. 13 to FIG. 16 will be used to further describe the insertion processing, using a concrete example.

Figure 12A:
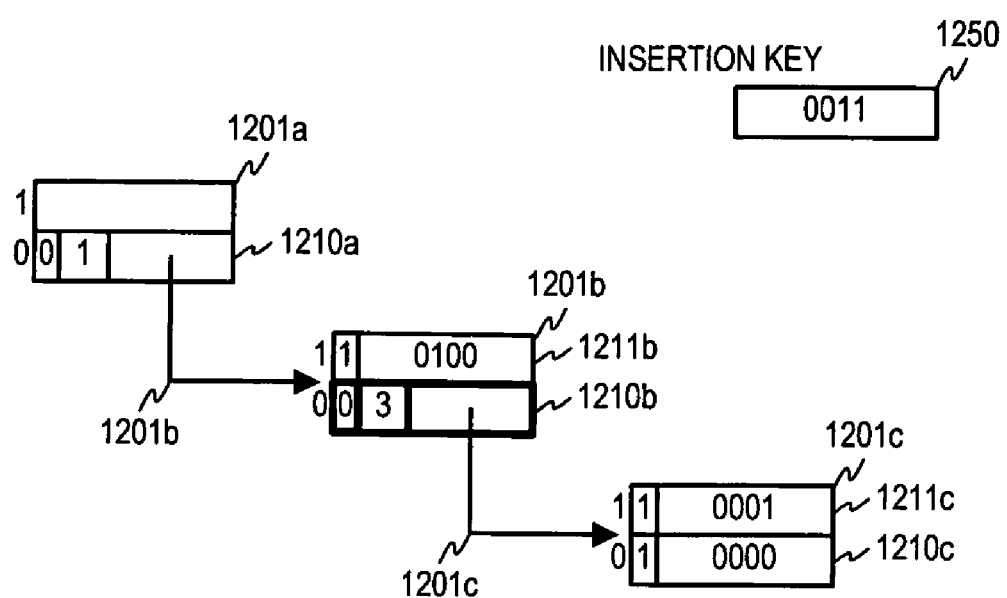
FIG. 12A is a drawing describing the coupled node tree and the insertion key "0011" before insertion processing.

What is shown in FIG. 12A is the coupled node tree that has the bit strings "0100," "0001," and "0000" as index keys, and the temporary storage area 1250, which holds the insertion key "0011" that is to be inserted. The example tree shown is made up of the node pairs 1201*a*, 1201*b*, and 1201*c*.

The primary node of the node pair 1201*a* is the root node 1210*a*, and 1 is held in the discrimination bit position thereof. The primary node 1210*b* of the node pair 1201*b* below the node pair 1201*a* is a branch node, with 3 stored in the discrimination bit position thereof, and the node 1211*b* forming a pair with the primary node 1210*b* is a leaf node, the in which the index key "0100" is held. The node 1210*b*, which is a branch node, is linked to the node pair 1201*c*.

Both the nodes 1210*c* and 1211*c* that form the node pair 1201*c* are leaf nodes, which hold the index keys "0000" and "0001," respectively.

Figure 12B:
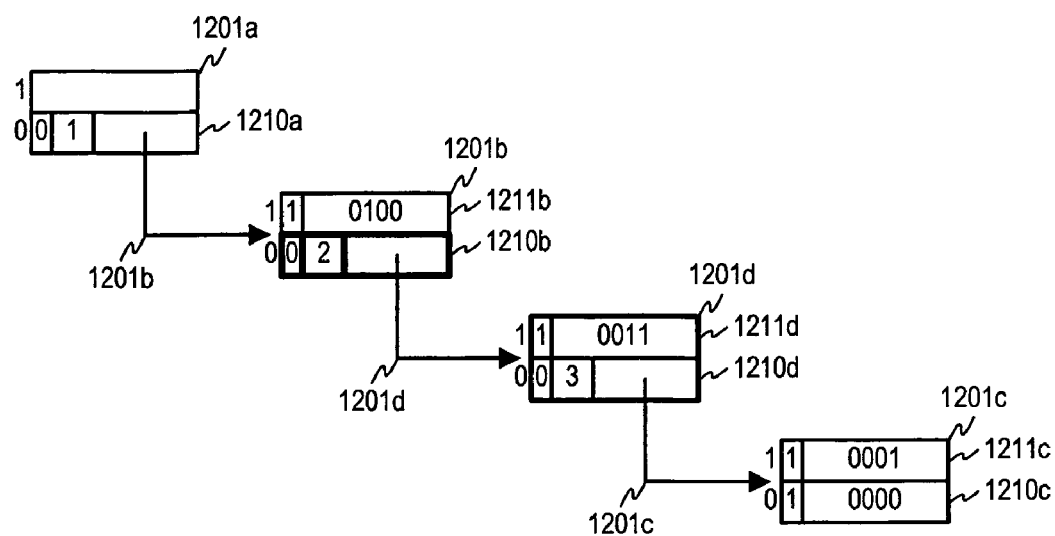
FIG. 12B is a drawing describing the coupled node tree after insertion processing.

FIG. 12B is a drawing showing the coupled node tree after the inserting of the insertion key "0011." The new node pair 1201*d* is inserted between the node pair 1201*b* and the node pair 1201*c*.

If FIG. 12A and FIG. 12B are compared, the contents of the inserted node 1210*d* are the contents of the node 1210*b* before the insertion, and the discrimination bit position of the node 1210*b* after insertion change from 3 to 2.

FIG. 13 to FIG. 16, with reference being made to FIG. 5 to FIG. 7 as appropriate, will now be used to describe the insertion processing shown as an example in FIG. 12A and FIG. 12B. The processing flow indicated by the thick lines in FIG. 13 to FIG. 16 is in accordance with the example shown in FIG. 12A and FIG. 12B. The reference numerals such as S501 indicate that the associated processing corresponds to steps S501 and the like noted in FIG. 5 to FIG. 7.

Figure 13:
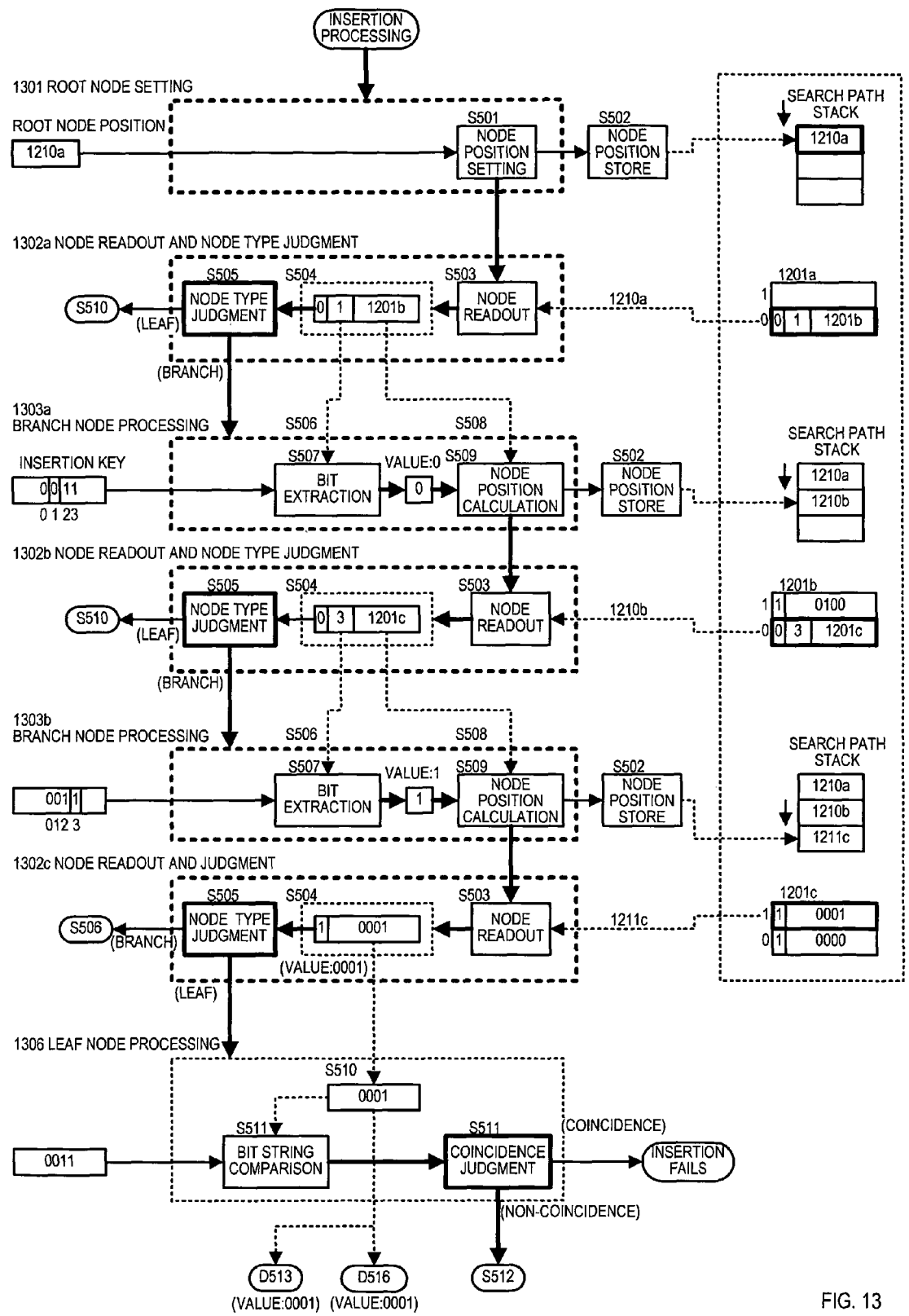
FIG. 13 is a drawing describing the processing block flow in the search processing, which is the first part of the insertion processing of FIG. 5.

FIG. 13 is a drawing describing the processing block flow in the search processing, which is the first stage of the insertion processing shown in FIG. 5.

As shown in FIG. 13, in the first processing block, that is the root node setting block 1301, root node setting is performed. By obtaining the root node array element number, the position of the root node is set. The obtained array element number 1210*a* is stored in the search path stack. At this point, the symbol that represents the node serves also as the symbol of the array element number.

Next, by the node readout and node type judgment block 1302*a* performing processing of step S503, step S504, and step S505, the node 1210*a* is judged to be a branch node, and branch node processing is performed by the branch node processing block 1303*a*.

In the branch node processing, the 0 at the bit position 1 of the "0011" insertion key and the array element number 1201*b* stored in the coupled node indicator of the node 1210*a* are added to calculate the node position of the link target. In this case, the array element number stored in the coupled node indicator is represented by the symbol of the node pair. The calculated node position 1210*b* is stored in the search path stack.

Based on the node position calculated in the branch node processing, the node readout and node type judgment processing is again performed by the node readout and node type judgment block 1302*b*, and the node 1210*b* is read out, the judgment being made that this is a branch node.

At that point branch node processing 1303*b* is again performed, the 1 of the bit position 3 of the insertion key "0011" and the array element number 1201*c* stored in the coupled node indicator of the node 1210*b* being added to calculate the node position of the link target. The calculated node position 1211*c* is stored in the search path stack.

In the next node readout and node type judgment processing 1302*c*, the node 1211*c* is read out, and the judgment is made that this is a leaf node.

At that point, processing branches to the leaf node processing 1306, and a bit string comparison is performed between the index key "0001" of the node 1211*c* and the insertion key "0011," the insertion failing if there is coincidence. If there is non-coincidence, however, advance is made to the next processing.

The output symbols such as D513 noted at the ends of the dotted-line arrows indicate that data connected to one end of the dotted line is used at the entry point having the same symbols. The 513 of the symbol D513 indicates use in step S513. The above applies as well to FIG. 14 to FIG. 16.

Figure 14:
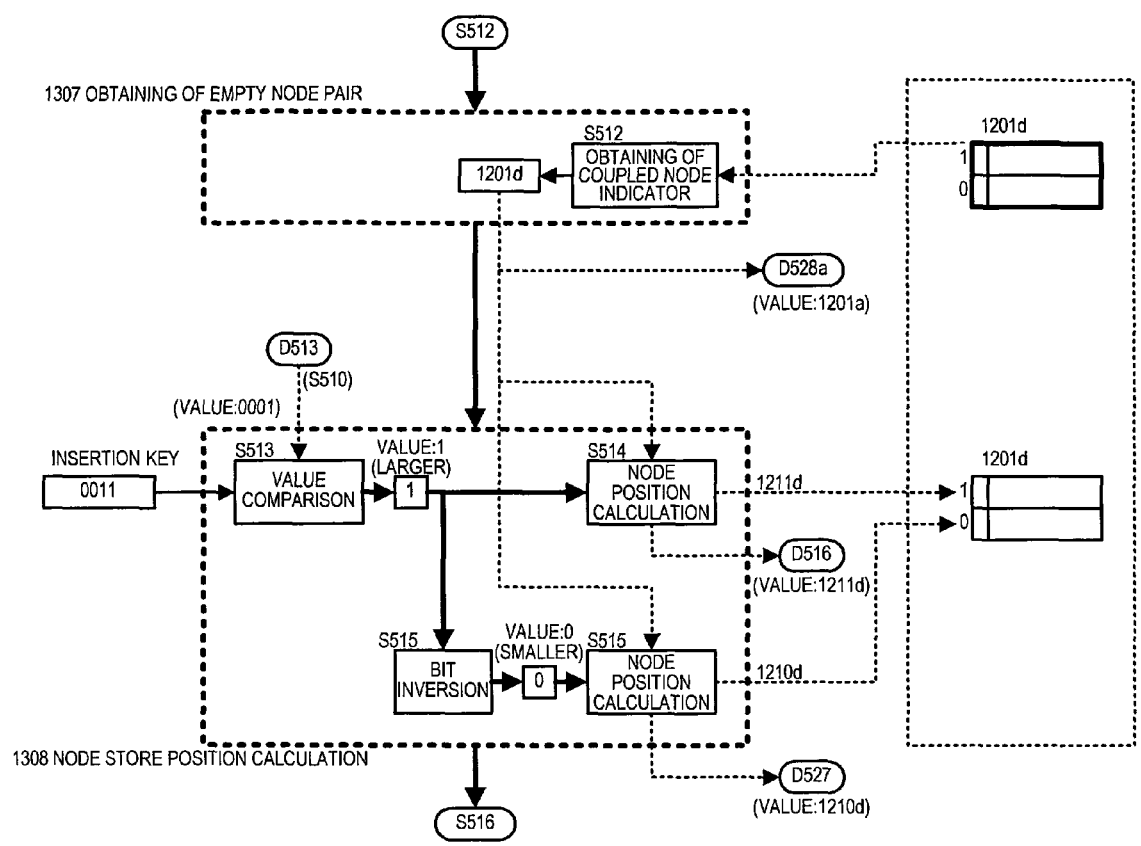
FIG. 14 is a drawing describing the processing block flow that prepares an array element for a node pair to be inserted as shown in FIG. 6.

FIG. 14 is a drawing describing the processing block flow that prepares an array element for a node pair to be inserted as shown in FIG. 6.

In the empty node pair obtaining block 1307, the coupled node indicator 1201*d* associated with array element numbers of two contiguous empty array elements is obtained from the array.

Next, in the node store position calculation block 1308, a value comparison is performed between the insertion key "0011" and the index key "0001" obtained at step S510, and a determination is made as to which of the two array elements of the obtained empty node pair the leaf node that holds the insertion key is to be stored. The result of the comparison is that the insertion key is larger, the leaf node that holds the insertion key is stored as the node 1211*d* in the array element having the array element number obtained by adding 1 to the coupled node indicator 1201*d*.

Figure 15:
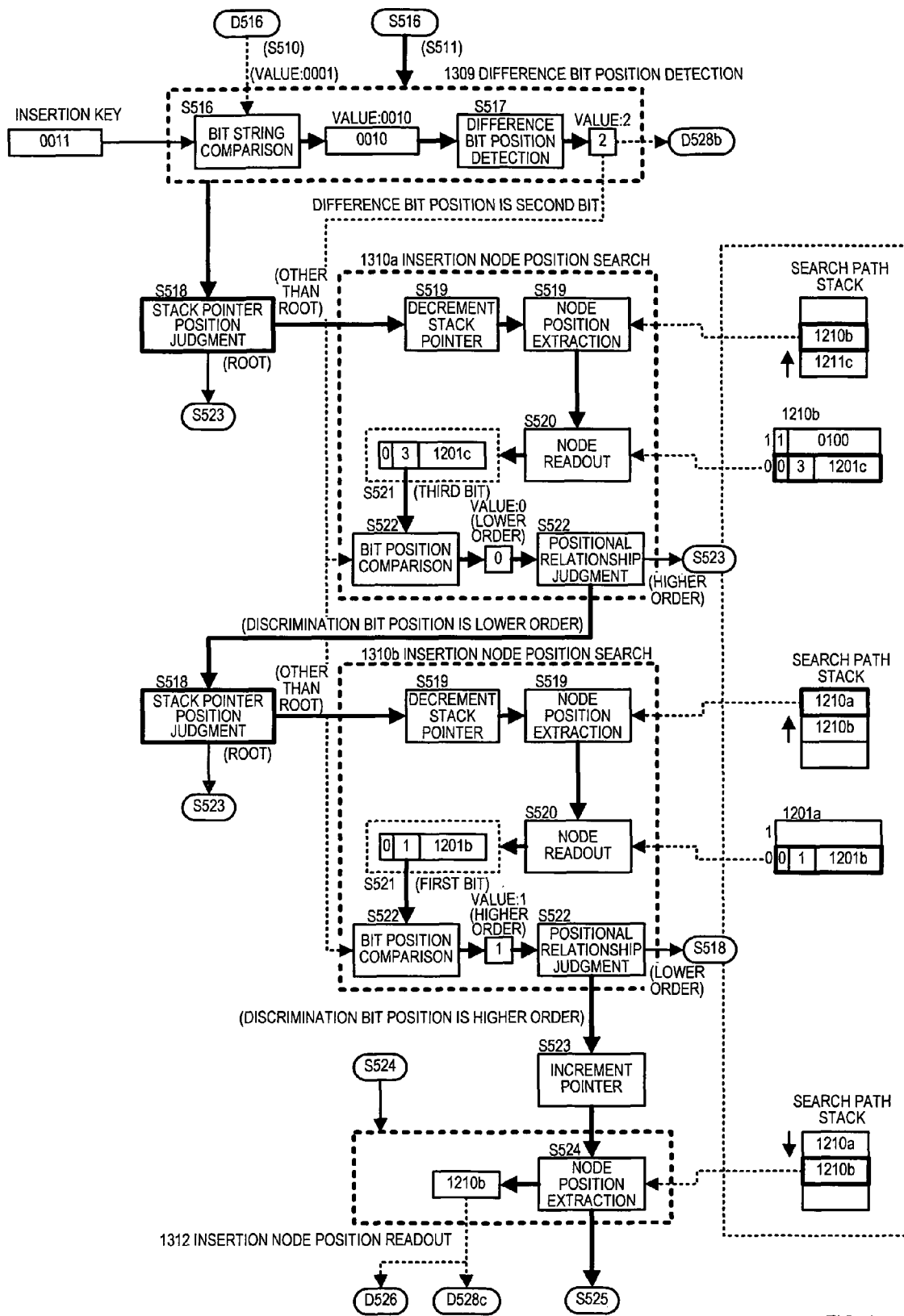
FIG. 15 is a drawing describing the first stage of the processing flow of the processing shown in FIG. 7 for determining the position on the coupled node tree of a node pair to be inserted.

FIG. 15 is a drawing describing the processing flow for determining the position in the coupled node tree of node pairs, which is the first stage of insertion processing as shown in FIG. 7.

In the difference bit position detection block 1309, the bit-by-bit exclusive-OR of "0010" is calculated between the insertion key "0011" and the index key "0001" obtained at step S510, thereby determining that the difference bit position is the bit position 2.

In the insertion node position searching block 1310*a*, a comparison is performed between the discrimination bit position of the node stored in the array element having the array element number pointed to by the pointer of the search path stack, as the pointer is successively decremented until the discrimination bit position becomes the higher order. If the pointer midway points to the array element number of a root node, the insertion position is immediately below the root node.

Because at the stage before the start of the search for the insertion node position, the pointer of the search path stack points to the array element number 1211*c*, the pointer is decremented by 1 and the insertion node position search processing is started, the store position of the node 1210*b* being extracted from the search path stack and the node 1210*b* being read out. Because the discrimination bit position of the node 1210b is 3, which is of lower order than the difference bit position 2, and the node 1210b is not a root node, the search for the insertion node position is continued by the insertion node position search block 1310b.

When the pointer is decremented by 1 again, the store position of the node 1210a is extracted and the node 1210a is read out. Because the discrimination bit position of the node 1210a is 1, which is of higher order than the difference bit position, the pointer position is incremented by 1 and the insertion node position readout block processing 1312 is performed.

Because when the readout of the insertion position is performed the pointer of the search path stack points to the array element number 1210b, the array element number 1210b is read out as the insertion position of the node to be inserted.

Figure 16:
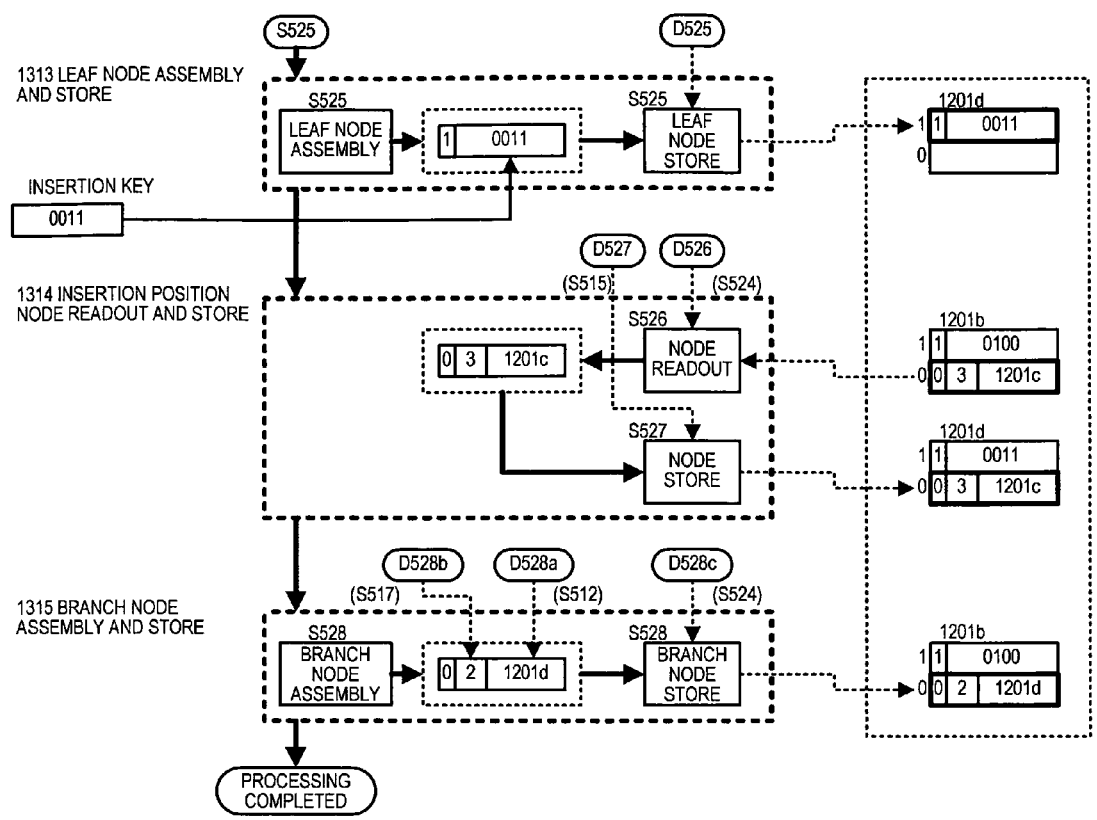
FIG. 16 is a drawing describing the second stage of the processing flow of the processing shown in FIG. 7 for setting the data of each node and completing the insertion processing.

FIG. 16 is a drawing describing the second stage of the processing flow of the processing shown in FIG. 7 for setting the data of each node and completing the insertion processing.

In the leaf node assembly and store block 1313, a leaf node in which the node type of 1 and the insertion key "0011" is stored in the index key is assembled, storage being done into the array element having the array element number 1211d that is calculated in the node store position calculation block 1308 shown in FIG. 14.

Next, in the insertion position node readout and store block 1314, the node 1210b having the array element number read out at the insertion node position readout block 1312 shown in FIG. 15 is read out, and the contents thereof are stored in the array element having the array element number 1210d calculated in the node store position calculation block 1308 shown in FIG. 14.

Next, in the branch node assembly and store block 1315, a branch node is assembled in which 0 is stored in the node type, the difference bit position 2 detected in the difference bit position detection block 1309 indicated in FIG. 15 is stored in the discrimination bit position, and the coupled node indicator obtained in the empty node pair obtaining block 1307 shown in FIG. 14 is stored in the coupled node indicator. Then, the assembled branch node is stored in the array element having the array element number 1210b read out at the insertion node position readout block 1312 shown in FIG. 15.

By the above-noted processing, the insertion key "0011" is inserted into the coupled node tree shown in FIG. 12A, thereby completing the coupled node tree shown in FIG. 12B.

Although the foregoing is a detailed description of a preferred mode of embodying the present invention, the embodiments of the present invention are not limited in this manner, and it will be clear to a person skilled in the art that a variety of modifications thereof are possible.

Also, it will be understood that the bit string searching apparatus of the present invention can be implemented in a computer by a storage means for storing the coupled node tree and a program that the computer is caused to execute to perform the processing shown in FIG. 4.

Additionally, it is clear that it is possible to embody an index insertion method according to the present invention by a program that a computer is caused to execute to perform the index insertion processing shown in FIG. 8 and in FIG. 5 to FIG. 7 and its equivalents, and that it is possible to embody an index deletion method according to the present invention by a program that a computer is caused to execute to perform the index deletion processing shown in FIG. 9 and FIG. 10 and its equivalents. Also, it is apparent that these programs embodied in a computer can realize a means for identifying a branch node and a leaf node and a means for linking to one of a node pair of a link target in response to the discrimination bit position of the branch node etc.

Therefore, the above-noted programs, and a computer-readable storage medium into which the programs are stored are encompassed by the embodiments of the present invention. Additionally, the data structure of the coupled node tree according to the present invention is encompassed by the embodiments of the present invention.

By using the coupled node tree provided by the present invention and having a totally novel data structure as described in detail above, it is possible to perform searching of bit strings at higher speeds, and also to easily perform additions and deletions of bit string data.

What is claimed is:

1. A bit string searching apparatus for searching for index keys, wherein based on a tree data structure that holds index keys composed of bit strings that are object of searches by means of a search key composed of a bit string, comprising:

a coupled node tree having a root node as a starting point of the tree and node pairs which are configurational elements of the tree and which are two nodes arranged in adjacent areas of storage, wherein the nodes have an area that holds a node type which indicates whether the node is a branch node or a leaf node, and the branch node having, in addition to the node type, an area that holds a discrimination bit position of the search key and an area holding information that indicates a position of one node of a node pair that is a link target but not having an area holding an index key composed of a bit string that is an object of searches, the leaf node having, in addition to the node type, an area holding the index key composed of a bit string that is the object of searches but not having an area that holds a discrimination bit position of the search key nor an area holding information that indicates the position of one node of a node pair that is a link target;

a root node read-out means obtaining information indicating a position of the root node and reading out the root node by means of the information indicating the position of the root node;

a node type determination means reading out the node type from the area that holds the node type of a node and determining whether the node type indicates a leaf node or a branch node;

an index key read-out means reading out the index key from the area in the leaf node holding the index key;

a link means reading out the discrimination bit position and the information indicating the position of one node of a node pair that is a link target from the area in the branch node holding the discrimination bit position and from the area holding the information indicating the position of one node of a node pair that is a link target respectively, and obtaining information indicating a node position by a calculation with a bit value in the search key at the discrimination bit position read out and the information indicating the position of one node of a node pair that is a link target, and reading out a node at the node position indicated by the obtained information as a link target node; and wherein
the node type determination means makes a determination of the node type of the root node read out by the root node read-out means, and
if the node type indicates a leaf node,
the index key read-out means reads out the index key from the leaf node, and
if the node type indicates a branch node,
reading out the link target node by the link means and the determination of the node type, by the node type determination means, of the link target node read out are repeated, until the node type indicates a leaf node, and
the index key read-out means reads out the index key from the leaf node, and
a comparison is performed between an index key read out by the index key read-out means and the search key, and
the search succeeds if there is coincidence therebetween but fails if there is no coincidence therebetween.

2. A bit string searching apparatus according to claim 1, wherein the coupled node tree is stored in an array, the information indicating the position of one node of a node pair of a link target being the array element number of an array element of the array in which the node is stored.

3. An index key deletion method for deleting an arbitrary leaf node that includes an index key from the coupled node tree of a bit string searching apparatus according to claim 2, the method comprising:
searching for the leaf node from the coupled node tree using the index key as a search key;
storing into the branch node of the link origin of the searched leaf node the contents of a node forming one and the same node pair with the leaf node that holds the index key to be searched for; and
deleting the node pair.

4. A program for execution by a computer of the index key deletion method according to claim 3.

5. A computer-readable storage medium storing the program according to claim 4.

6. An index key insertion method, wherein a bit string searching apparatus for searching for index keys which searches for index keys based on a tree data structure that holds index keys composed of bit strings that are object of searches by means of a search key composed of a bit string inserts a desired insertion key composed of a bit string as the index key into the tree, the method comprising:
wherein
the tree is a coupled node tree stored in an array and having a root node as a starting point of the tree and node pairs which are configurational elements of the tree and which are two nodes arranged in adjacent array elements in the array, and the nodes have an area that holds a node type, which indicates whether the node is a branch node or a leaf node, and
the branch node having, in addition to the node type, an area which holds a discrimination bit position of the search key and an area holding an array element number of an array element holding one node of a node pair that is a link target but not having an area holding an index key composed of a bit string that is an object of searches,
the leaf node having, in addition to the node type, an area holding the index key composed of a bit string that is the object of searches but not having an area that holds the discrimination bit position of the search key nor an area holding an array element number of an array element holding one node of a node pair that is a link target;
wherein
the bit string searching apparatus comprises
a root node read-out means obtaining an array element number of the array element in the array holding the root node and reading out the root node from the array element with the array element number, and
a node type determination means reading out the node type from the area that holds the node type of the node and determining whether the node type indicates a leaf node or a branch node, and
an index key read-out means reading out the index key from the area in the leaf node holding the index key, and
a link means reading out the discrimination bit position and the array element number of the array element in the array wherein is stored one node of a node pair that is a link target from the area in the branch node holding the discrimination bit position and from the area holding the array element number of the array element in the array wherein is stored one node of a node pair that is a link target respectively, and obtaining an array element number of the array element in the array by a calculation with a bit value in the search key at the discrimination bit position read out and the array element number of the array element in the array wherein is stored one node of a node pair that is a link target, and reading out the node stored in the array element with the array element number obtained as a link target node;
a search step wherein, using the insertion key as the search key, the root node is read out by the root node read-out means, and a determination of the node type of the root node read out is made by the node type determination means, and if the node type indicates a leaf node, the index key is read out from the leaf node by the index key read-out means and if the node type indicates a branch node, reading out the link target node by the link step and the determination of the node type, by the node type determination step, of the link target node read out are repeated, until the node type indicates a leaf node, and array element numbers of the array elements in which the root node and link target nodes until the leaf node are stored are successively stored in a stack;
a comparison step wherein a value comparison and bit string comparison is made between the index key read out from the leaf node in the search step and the insertion key;
an empty node pair obtaining step wherein an empty array element pair to store the node pair is obtained from the array and an array element number of one array element of the empty array element pair is obtained;
a leaf node storage position decision step wherein a decision is made, by means of the value comparison at the comparison step, as to which of empty array elements in the empty array element pair obtained in the empty node pair obtaining step is to be the leaf node holding the insertion key;
a node pair insertion position decision step wherein an array element number stored in the stack is read out by relative positional relationship between the bit position of a first differing bit found in the bit string comparison at the comparison step and the discrimination bit position of the branch node stored in the array element with the array element number stored in the stack, and a node stored in the array element with that array element number is decided to be an insertion position as a link origin of the node pair to be stored in the empty array element pair obtained in the empty node obtaining step;

an insertion node pair generating step wherein an insertion node pair is generated by writing the node type indicating a leaf node into the node type area of the leaf node arranged in the empty array element that is decided in the node pair insertion position decision step and writing the insertion key into the area holding the index key and reading out contents of the node stored in the array element with the array element number read out from the stack in the node pair insertion position decision step and writing the contents into the other array element of the empty array element pair; and a branch node generating step wherein the node stored in the array element with the array element number read out in the node pair insertion position decision step is made into a branch node by writing the node type indicating a branch node into the area holding the node type, writing the bit position of the first differing bit found in the bit string comparison at the comparison step into the area holding the discrimination bit position, and writing the array element number obtained in the empty node pair obtaining step into the area holding the array element number of the array element in the array which holds one node of the node pair that is the link target.

7. A coupled node tree generation method wherein a bit string searching apparatus for searching for index keys which searches for index keys based on a tree data structure that holds index keys composed of bit strings that are object of searches by means of a search key composed of a bit string generates the tree, the method comprising:

wherein the tree is the coupled node tree and the bit string searching apparatus are according to claim 6;

extracting an index key from a set of index keys;

generating a coupled node tree whose rout node is a leaf node which includes the extracted index key; and extracting successively the other index keys from the set of index keys and repeating the index key insertion method so as to create the coupled node tree corresponding to the set of index keys.

8. A program for execution by a computer of the coupled node tree generation method according to claim 7.

9. A computer-readable storage medium storing the program according to claim 8.

10. A program for execution by a computer of the index key insertion method according to claim 6.

11. A computer-readable storage medium storing the program according to claim 10.

12. A bit string searching method wherein a bit string searching apparatus searches for index keys based on a tree data structure that holds index keys composed of bit strings that are object of searches by means of a search key composed of a bit string, comprising:

wherein the tree is a coupled node tree having a root node as a starting point of the tree and node pairs which are configurational elements of the tree and which are two nodes arranged in adjacent areas of storage, and the nodes have an area that holds a node type, which indicates whether the node is a branch node or a leaf node, and the branch node having, in addition to the node type, an area that holds a discrimination bit position of the search key and an area holding information that indicates a position of one node of a node pair that is a link target but not having an area holding an index key composed of a bit string that is an object of searches, the leaf node having, in addition to the node type, an area holding the index key composed of a bit string that is the object of searches but not having an area that holds the discrimination bit position of the search key nor an area holding information that indicates the position of one node of a node pair that is a link target;

a root node read-out step obtaining information indicating a position of the root node and reading out the root node by means of the information indicating the position of the root node;

a node type determination step reading out the node type from the area that holds the node type of a node and determining whether the node type indicates a leaf node or a branch node;

an index key read-out step reading out the index key from the area in the leaf node holding the index key;

a link step reading out the discrimination bit position and the information indicating the position of one node of a node pair that is a link target from the area in the branch node holding the discrimination bit position and from the area holding the information indicating the position of one node of a node pair that is a link target respectively, and obtaining information indicating a node position by a calculation with a bit value in the search key for the discrimination bit position read out and the information indicating the position of one node of a node pair that is a link target, and reading out a node at the node position indicated by the obtained information as a link target node;

and wherein the node type determination step makes a determination of the node type of the root node read out by the root node read-out step, and if the node type indicates a leaf node, the index key read-out step reads out the index key from the leaf node, and if the node type indicates a branch node, reading out the link target node by the link step and the determination of the node type, by the node type determination step, of the link target node read out are repeated, until the node type indicates a leaf node, and the index key read-out step reads out the index key from the leaf node, and a comparison is performed between an index key read out by the index key read-out step and the search key, and the search succeeds if there is coincidence therebetween but fails if there is no coincidence therebetween.

13. A bit string searching method according to claim 12, wherein the coupled node tree is stored in an array, the information indicating the position of one node of a node pair of a link target being the array element number of an array element of the array in which the node is stored.

14. A program for execution by a computer of the bit string searching method according to claim 12.

15. A computer-readable storage medium storing the program according to claim 14.

16. A tree data structure used in bit string searching, comprising:

a root node as a starting point of the tree and node pairs which are configurational elements of the tree and which are two nodes arranged in adjacent areas of storage, wherein the nodes have an area that holds a node type, which indicates whether the node is a branch node or a leaf node, and the branch node includes, in addition to the node type, an area which holds a discrimination bit position of the search key and an area holding information that indicates a position of one node of a node pair that is a link target but not having an area holding an index key composed of a bit string that is an object of searches, the leaf node includes, in addition to the node type, an area holding the index key composed of a bit string that is the object of searches but not having an area that holds the discrimination bit position of the search key nor an area holding information that indicates the position of one node of a node pair that is a link target; and wherein the bit string searching method according to claim 12 is enabled using the tree data structure.

17. A computer-readable storage medium on which the tree data structure according to claim 16 is embodied.

18. A tree data structure according to claim 16, wherein the coupled node tree is stored in an array, the information indicating a position of one node of a node pair of a link target being an array element number of an array element of the array in which the node is stored.

19. A computer-readable storage medium on which the tree data structure according to claim 18 is embodied.

* * * * *